United States Patent
Grube et al.

(10) Patent No.: US 10,015,141 B2
(45) Date of Patent: *Jul. 3, 2018

(54) DISPERSED DATA STORAGE IN A VPN GROUP OF DEVICES

(71) Applicant: CLEVERSAFE, INC., Chicago, IL (US)

(72) Inventors: Gary W. Grube, Barrington Hills, IL (US); Timothy W. Markison, Mesa, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 208 days.

This patent is subject to a terminal disclaimer.

(21) Appl. No.: 14/328,311

(22) Filed: Jul. 10, 2014

(65) Prior Publication Data

US 2014/0325224 A1    Oct. 30, 2014

Related U.S. Application Data

(63) Continuation-in-part of application No. 14/230,253, filed on Mar. 31, 2014, now Pat. No. 9,268,641, (Continued)

(51) Int. Cl.
*H04L 29/06* (2006.01)
*H04L 9/32* (2006.01)
(Continued)

(52) U.S. Cl.
CPC ...... *H04L 63/0272* (2013.01); *G06F 11/1092* (2013.01); *G06F 17/30194* (2013.01); *H04L 9/32* (2013.01); *H04L 2209/24* (2013.01)

(58) Field of Classification Search
CPC .......... G06F 17/30; G06F 15/16; G06F 11/10; H04L 9/32; H04L 63/02
See application file for complete search history.

(56) References Cited

U.S. PATENT DOCUMENTS 4,092,732 A    5/1978 Ouchi
5,454,101 A    9/1995 Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Wasika Nipa
(74) *Attorney, Agent, or Firm* — Garlick & Markison; Timothy W. Markison; Harry S. Tyson, Jr.

(57) ABSTRACT

A method begins when at least a consensus threshold number of devices are active in a virtual private network (VPN) group of devices. The method continues by encoding group specific data based on a consensus threshold number of devices in the VPN group of devices and a number of devices in the VPN group of devices to produce one or more sets of encoded data slices. The method continues by sending the one or more sets of encoded data slices to at least one of: the consensus threshold number of devices or a dispersed storage network (DSN) memory for storage therein. When the at least the consensus threshold number of devices are not active in the VPN group of devices, each of the devices in the VPN group of devices are prohibited from creating the group specific data or accessing previously created group specific data.

16 Claims, 19 Drawing Sheets

Related U.S. Application Data which is a continuation of application No. 12/862,878, filed on Aug. 25, 2010, now Pat. No. 8,688,907.

(60) Provisional application No. 61/264,504, filed on Nov. 25, 2009.

(51) Int. Cl.
*G06F 17/30* (2006.01)
*G06F 11/10* (2006.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,499,980 | B2 * | 3/2009 | Gusler .................. G06F 3/0608 709/203 |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 * | 4/2007 | Gladwin .............. G06F 21/6227 711/154 |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2010/0088520 | A1 * | 4/2010 | Charles ................. H04L 67/108 713/178 |
| 2011/0071841 | A1 * | 3/2011 | Fomenko .......... G06F 17/30206 705/1.1 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Confer-

(56) References Cited

OTHER PUBLICATIONS ence on Architectural Support for Programming Languages and Operating Systems (ASPLOS 2000); Nov. 2000; pp. 1-12.

* cited by examiner computing system 10

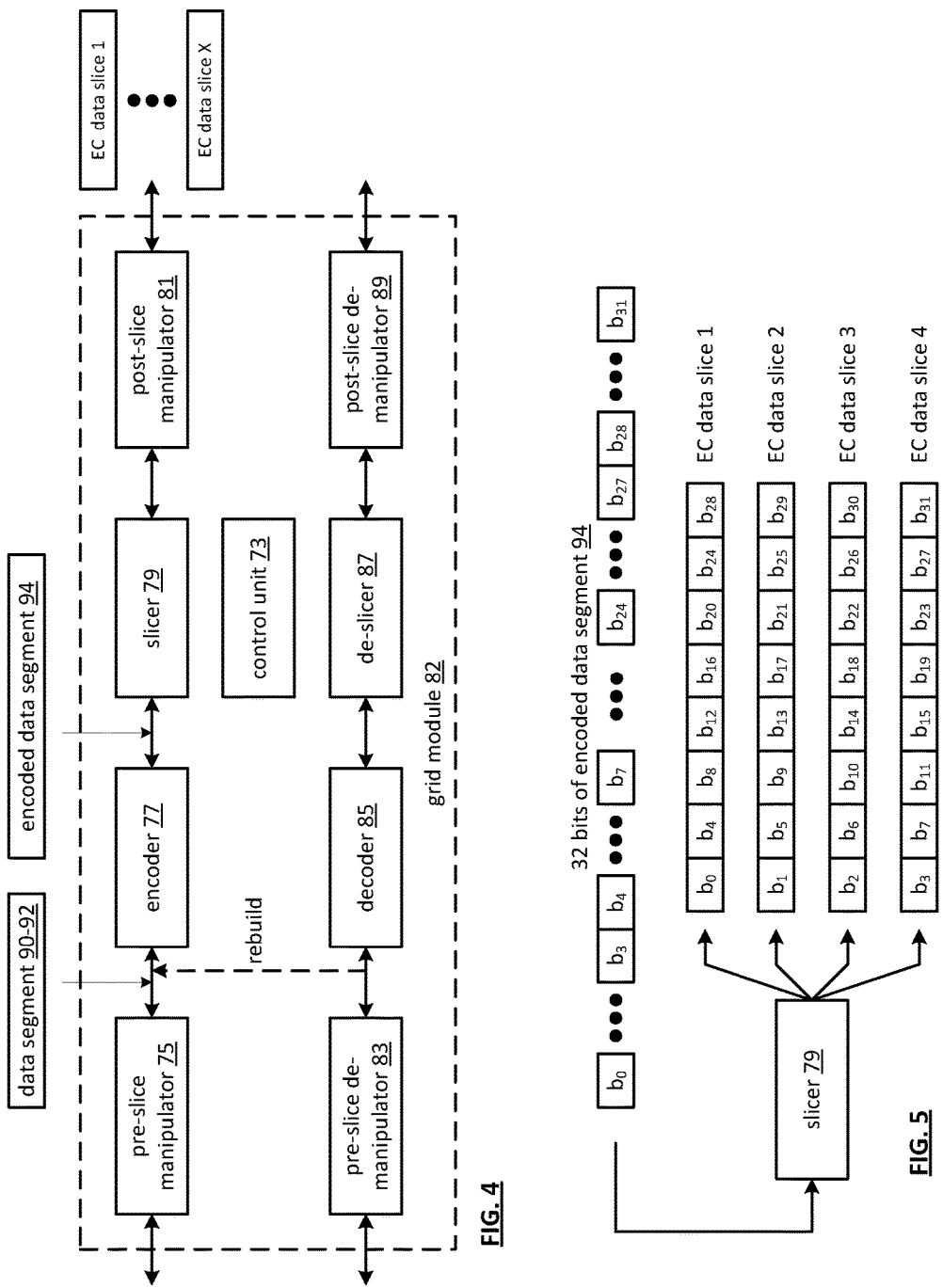

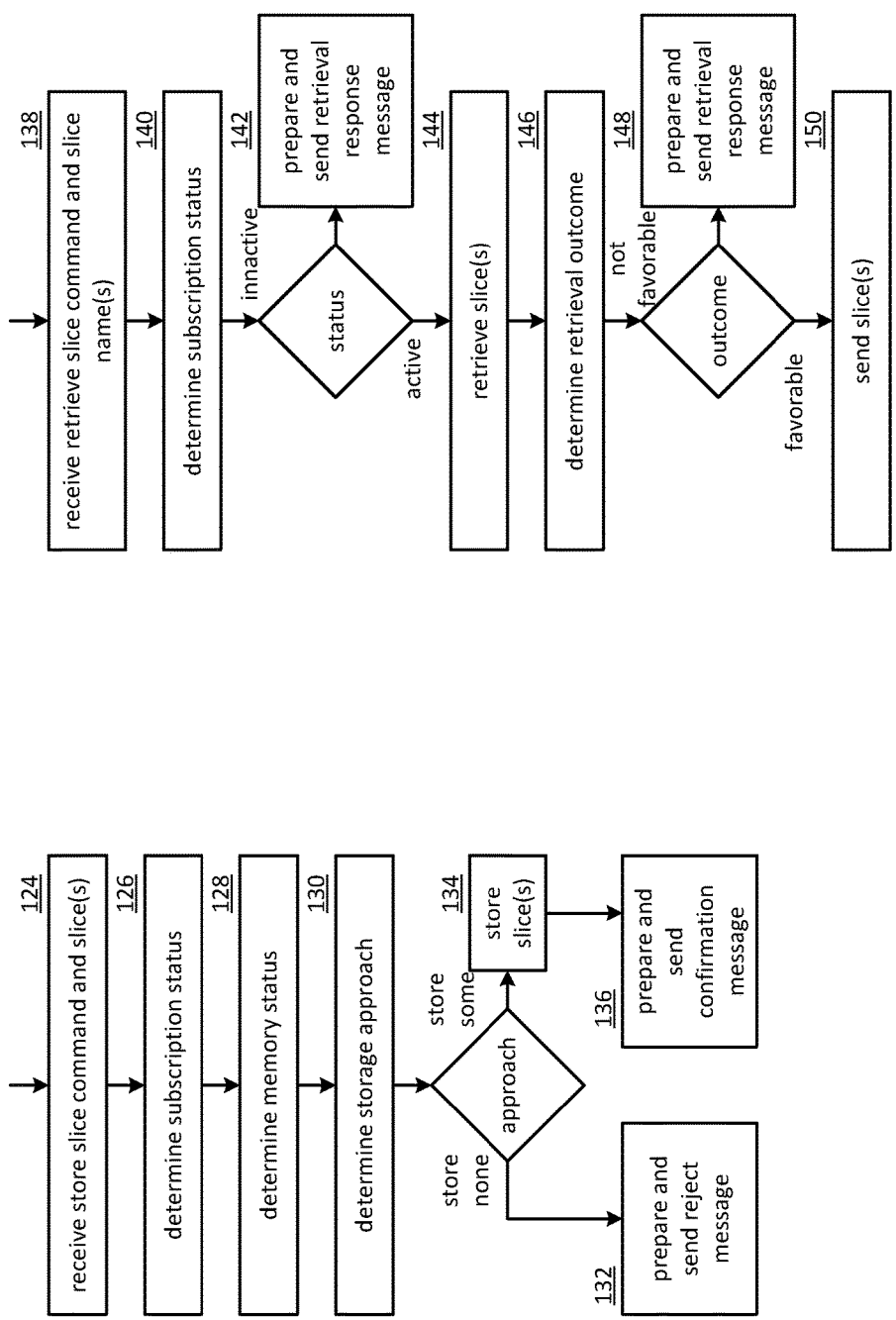

wireless device rating table 288

| device ID 290 | path 292 | path rating 294 | history 296 | device rating 298 |
|---|---|---|---|---|
| device 1 | p2p | 1 | 100% | 1 |
| | femto | 2 | 0% | |
| | wide area | 3 | 10% | |
| device 2 | p2p | 1 | 90% | 1 |
| | femto | 2 | 5% | 2 |
| | wide area | 3 | 8% | 2 |
| device 3 | p2p | 1 | 75% | 3 |
| | femto | 2 | 15% | |
| | wide area | 3 | 0% | 3 |
| device 4 | p2p | 1 | 25% | |
| | femto | 2 | 0% | 2 |
| | wide area | 3 | 85% | |
| device 5 | p2p | 1 | 0% | 3 |
| | femto | 2 | 50% | 4 |
| | wide area | 3 | 20% | |
| device 6 | p2p | 1 | 0% | |
| | femto | 2 | 0% | 4 |
| | wide area | 3 | 5% | |

DISPERSED DATA STORAGE IN A VPN GROUP OF DEVICES

CROSS REFERENCE TO RELATED PATENTS

The present U.S. Utility Patent Application claims priority pursuant to 35 U.S.C. § 120 as a continuation-in-part of U.S. Utility application Ser. No. 14/230,253, entitled "LARGE SCALE SUBSCRIPTION BASED DISPERSED STORAGE NETWORK," filed Mar. 31, 2014, which claims priority pursuant to 35 U.S.C. § 120 as a continuation of U.S. Utility application Ser. No. 12/862,878, entitled "LARGE SCALE SUBSCRIPTION BASED DISPERSED STORAGE NETWORK," filed Aug. 25, 2010, now issued as U.S. Pat. No. 8,688,907 on Apr. 1, 2014, which claims priority pursuant to 35 U.S.C. § 119(e) to U.S. Provisional Application Ser. No. 61/264,504, entitled "LARGE SCALE DISTRIBUTED STORAGE NETWORK,", filed Nov. 25, 2009, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the Internet to perform functions including email, web browsing, remote applications access, and media communications (e.g., telephony voice, image transfer, music files, video files, real time video streaming, etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

FIG. 8 is a flowchart illustrating an example of storing slices in accordance with the invention;

FIG. 9 is a flowchart illustrating an example of retrieving slices in accordance with the invention;

FIG. 21 is a table representing an example of a wireless device rating table in accordance with the present invention;

DETAILED DESCRIPTION OF THE INVENTION

Figure 1:
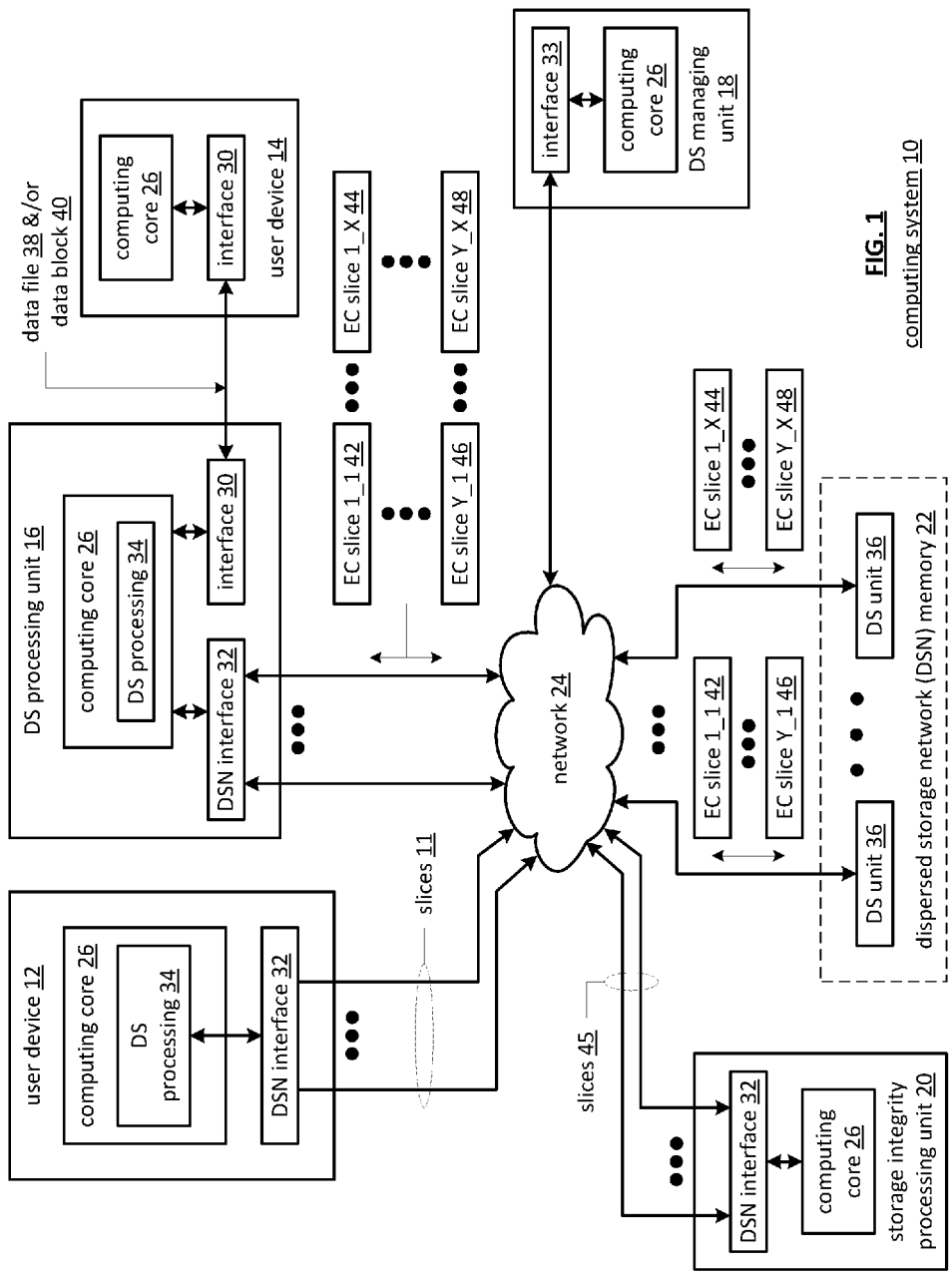
FIG. 1 is a schematic block diagram of an embodiment of a computing system in accordance with the invention.

FIG. 1 is a schematic block diagram of a system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-23.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general, and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-23.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
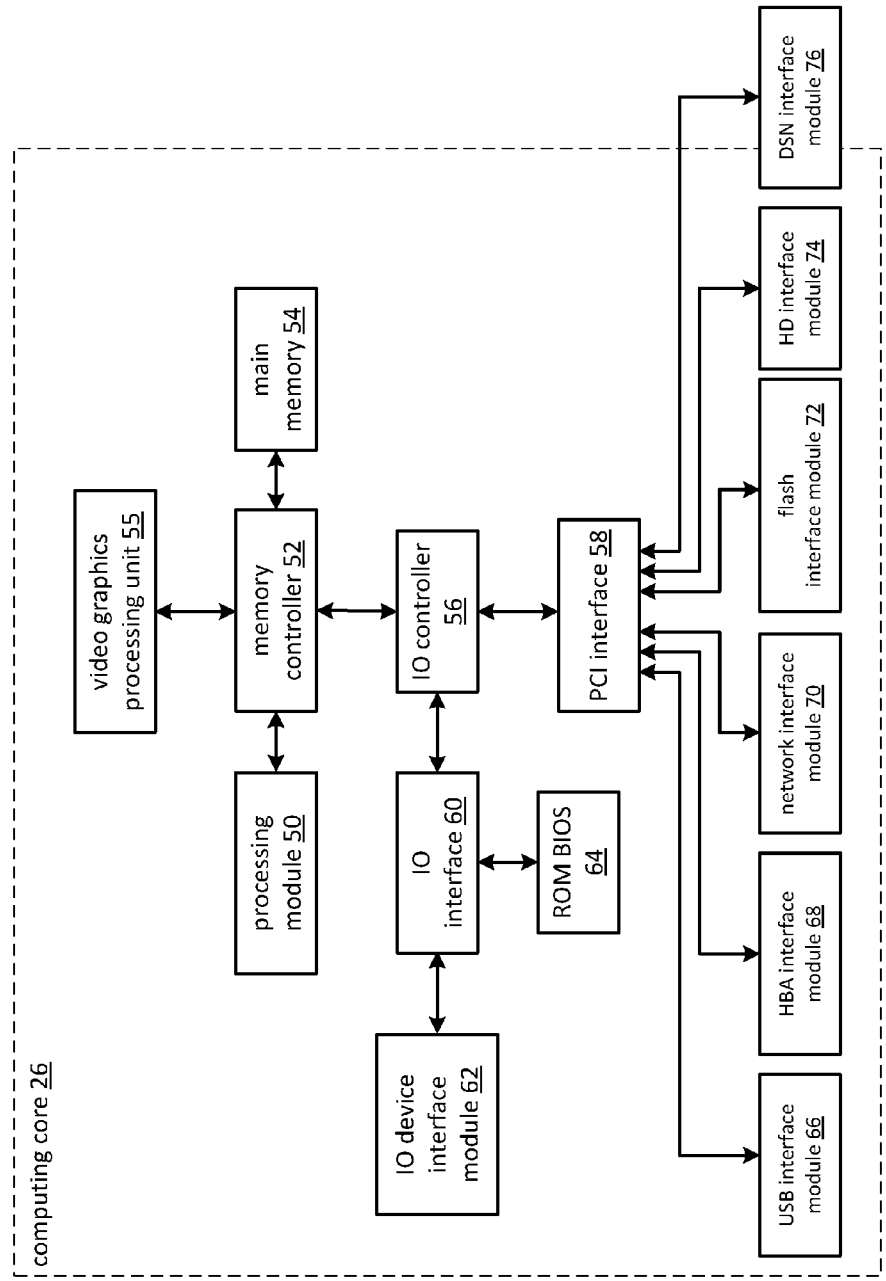
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the TO device interface module 62 and/or the memory interface modules may be collectively or individually referred to as TO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-23.

Figure 3:
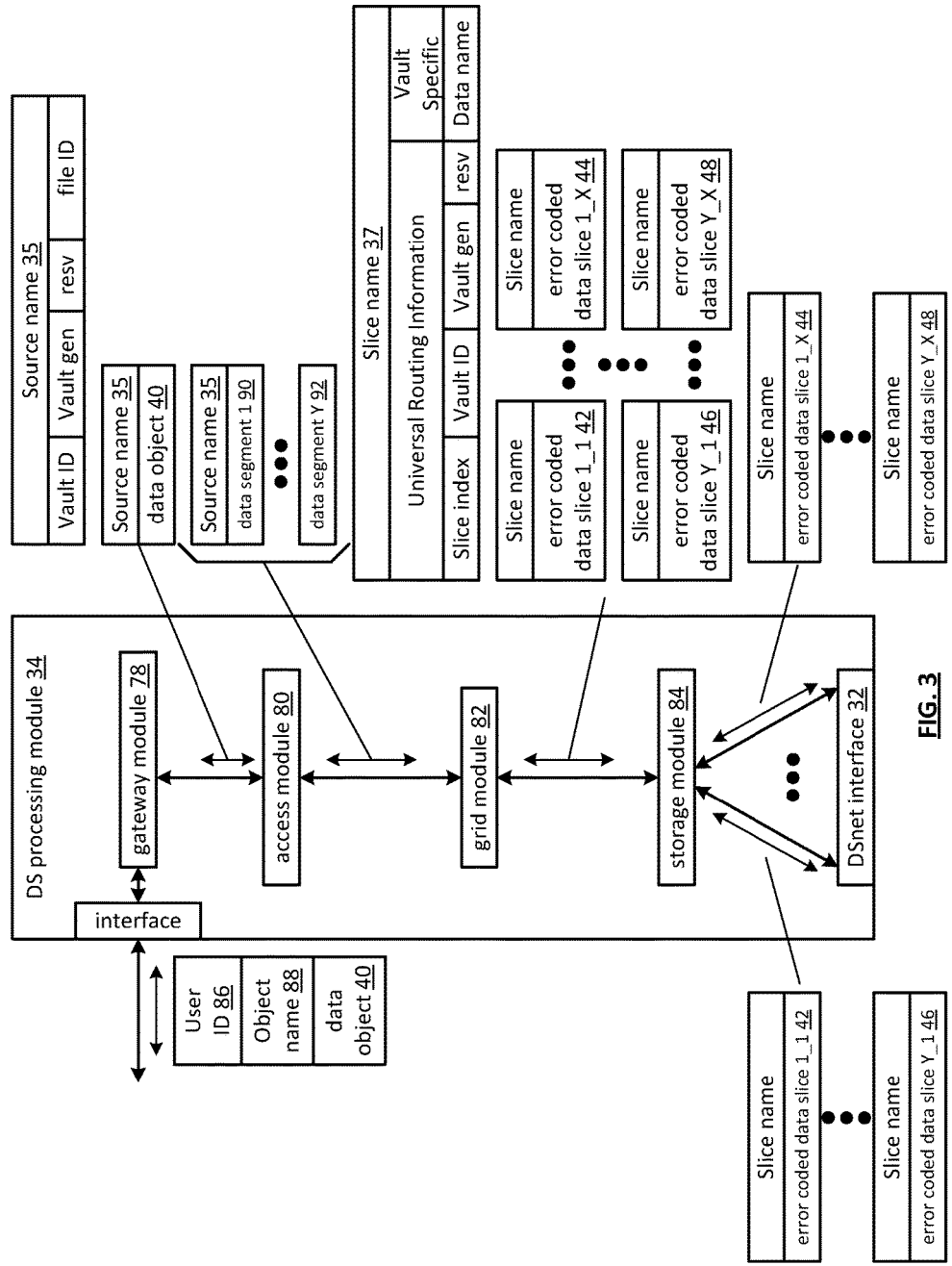
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the DS managing unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal storage function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X−T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
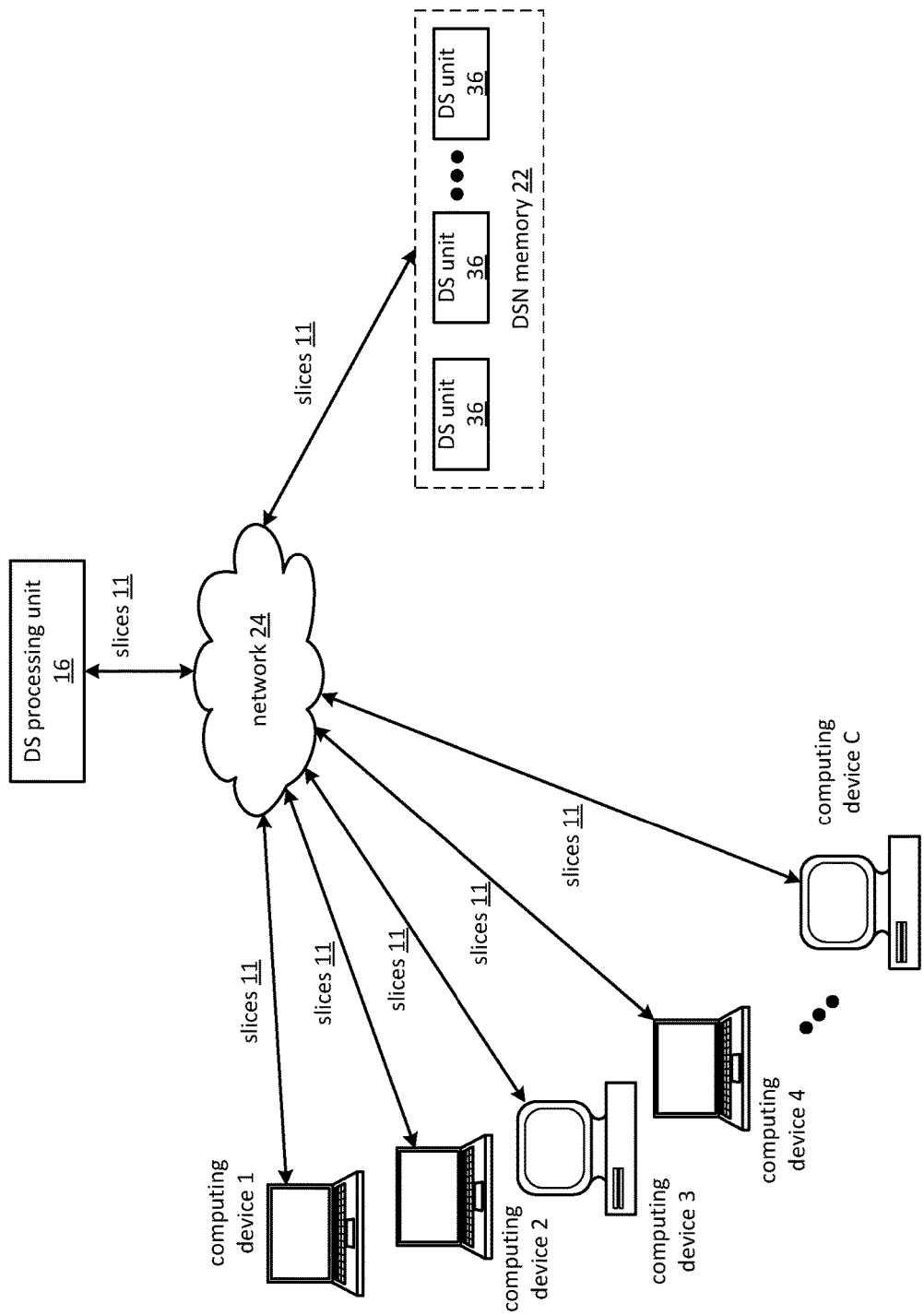
FIG. 6 is a schematic block diagram of another embodiment of a computing system in accordance with the invention.

FIG. 6 is a schematic block diagram of another embodiment of a computing system. As illustrated, the system includes a DS processing unit 16, a network 24, a dispersed storage network (DSN) memory 22, and a plurality of computing devices 1-C. The DSN memory 22 includes a plurality of DS units 36. Each of the computing devices 1-C includes local memory to store encoded data slices from other computing devices 1-C; may be a user device 12-14; and/or may be portable, mobile, or fixed device. The size of the local memory may be configured to store a predetermined amount of encoded data slices. In an example, the memory configuration includes at least two sections: one for storing data for other computers and one for storing its own data. The section used for storing other computer's data may be further divided, where a first portion is used to store encoded data slices and a second portion is used to store data that is not dispersed storage error encoded. Note that the sectioning and/or partitioning may change from time to time based on one or more of a user input, a command, and a memory utilization indicator (e.g., historical record of actual use). Further note that the computing device 1-C may be implemented as a network storage computer with a minimum amount of memory portioned for the storing of slices of other computing devices 1-C.

In an example of operation, computing device 3 sends a subscription request to the DS processing unit 16 to subscribe as an active participant in the utilization of the plurality of computing devices 1-C to store and retrieve encoded data slices. Once subscribed and the computing device 3 has data to store, it determines whether it should store the data locally and/or remotely and further determines whether to disperse storage error encode the data or not. For example, the computing device 3 determines to store a data object in its local memory in a non-encoded manner. As another example, the computing device 3 determines to disperse storage error encode the data and store the resulting encoded data slices in its local memory. As yet another example, the computing device 3 determines to store its data as encoded data slices in the local memory of one or more other computing devices (e.g., computing device 4). As a further example, the computing device determines to store its data directly in the DSN memory 22 as encoded slices 11. As still a further example, the computing device 3 determines to indirectly store its data in the DSN memory 22 and utilizes the DS processing unit 16 to encode the data object into encoded data slices 11 for storage in the DSN memory 22.

To initiate a subscription, the computing device 3 sends a subscription request to the DS processing unit 16, which processes the request, and sends a subscription response to the computing device 3. The response may indicate whether the subscription request is granted or not granted; whether the computing device shall send slices directly to other computing devices; or whether the computing device 3 is to send the data object to the DS processing unit 16 for encoding and dispersal. The DS processing unit 16 determines the subscription request response based on one or more of computing device ID, an authentication record (e.g., verification that the computing device is paying for the subscription), a network status indicator (e.g., capacity exists for more slice traffic), and a subscription pool availability indicator (e.g., enough subscribing computing devices exists to support distributedly storing data). For example, the DS processing unit 16 determines to grant the subscription request and enable direct storing of slices 11 to other computing devices when a corresponding account is in good standing and a subscription pool availability indicator status is favorable (e.g., enough capacity exists).

When the subscription request is granted and the computing device 3 desires to directly store dispersed storage error encoded data in one or more other computing devices, it sends one or more encoded data slices and a store slice command to the other computing device(s) (e.g., computing device 4). The computing device 4 determines its subscription status (e.g., previously and still granted permission to participate) and memory status (e.g., verification that enough memory is available to store the slices). The computing device 4 determines how much of the slices 11 to store based on one or more of the subscription status, the size of the slices, a loading indicator (e.g., is it too busy), and memory status and stores the slices 11 accordingly. The computing device 4 then sends a message to computing device 3 (e.g., that sent the slices) indicating the status of the slices (e.g., stored, not stored).

Sometime after storing one or more slices 11, the computing device 4 receives an encoded data slice retrieval request from computing device 3 (or another computing device such as computing device 2) with slice names. The computing device 4 determines its subscription status (e.g., previously and still granted permission to participate). The computing device 4 attempts to retrieve the slices 11 when the subscription status is still active. The computing device 4 verifies that the slices 11 are as they were stored (e.g., checksum integrity test). The computing device 4 then sends slices to computing device 3 (e.g., that requested retrieval of the slices) when the slice verification is favorable (e.g., as they were originally stored).

In another example of operation, computing device 1 sends a subscription request to the DS processing unit 16 when it has a file to store. The computing device 1 creates encoded data slices 11 of the data file and sends them to computing devices 3-9 for storage when the DS processing unit 16 grants the computing device 1 the subscription request to send slices 11 directly to other computing devices 3-9. The subscribing computing devices 3-9 store the slices 11 they receive from the computing device 1 when they have available memory. The subscribing computing devices 3-9 send storage confirmation messages to the computing device 1 for the slices stored. The computing device 1 saves the locations (e.g., computing device IDs 3-9) of the stored slices for use in a subsequent retrieval sequence. Computing devices 3-9 send the slices to the computing device 1 when receiving a retrieval request from computing device 1 and the computing devices 3-9 have sufficient capacity to execute the retrieval request. The method of operation of computing devices 1-C is discussed in greater detail with reference to FIGS. 7-9.

Figure 7:
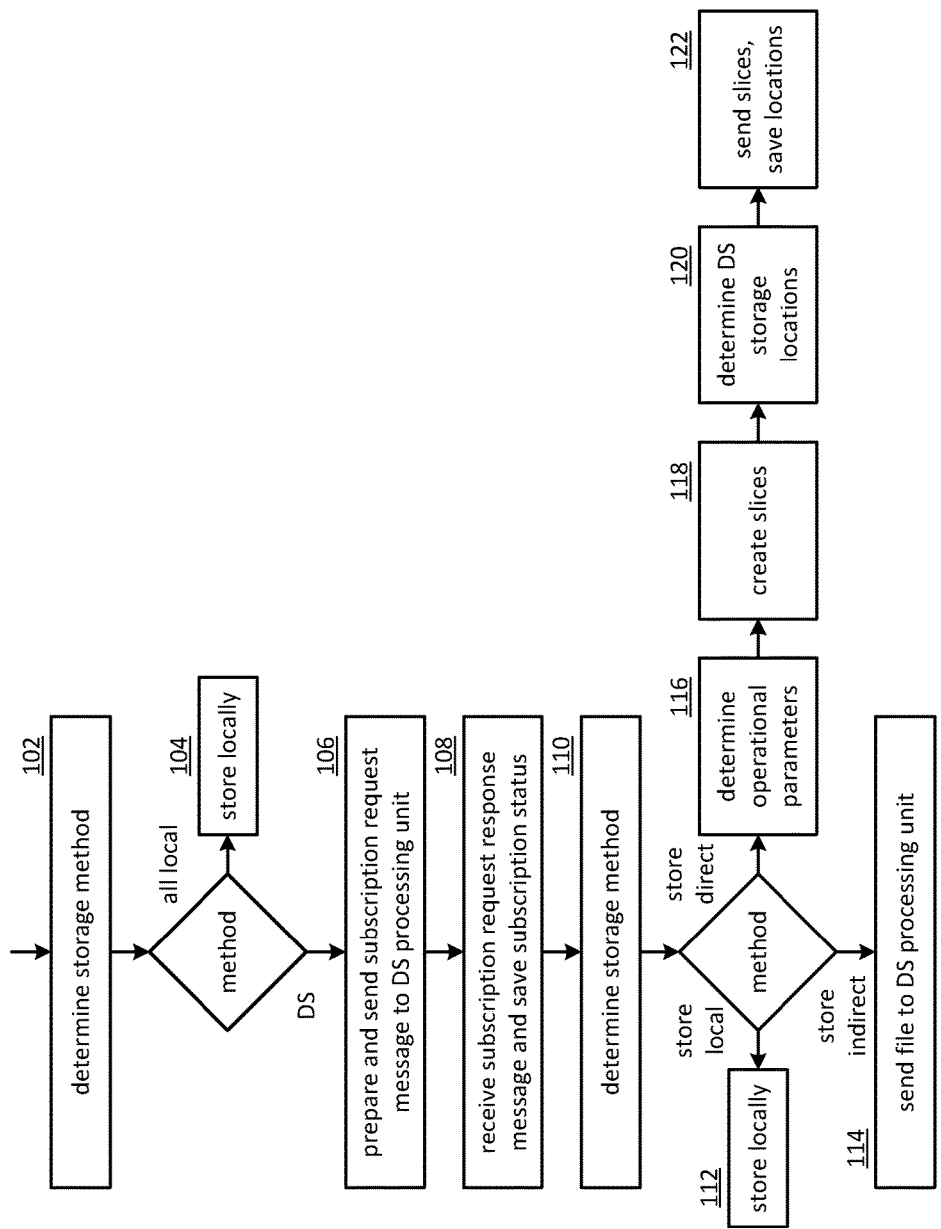
FIG. 7 is a flowchart illustrating an example of distributing slices in accordance with the invention.

FIG. 7 is a flowchart illustrating an example of a method for dispersed storage of data. The method begins at step 102 where a processing module (e.g., of a computing device) identifies data for storage and determines a storage method, which includes storing the data in local memory as a data file or in a plurality of memories (e.g., other computing devices, a DSN memory) as encoded data slices in accordance with an error code in dispersal storage function. Such a determination may be based on one of more of a data file type (e.g., video, music, text, etc.), a data file size, a security indicator, a performance requirement (e.g., retrieval latency), a cost requirement, a preference, and a command. When the processing module determines to store the data locally, the method continues at step 104 where the processing module stores the data locally by storing the data in the local memory device associated with the processing module. Note that the data may be stored as a plurality of encoded data slices or as a non-dispersed error encoded data.

When the processing module determines to store the data as dispersed encoded data slices, the method continues at step 106 where the processing module sends a subscription request message regarding the data to a DS processing unit. Note that the subscription request message includes one or more of a subscription request, a user device identifier, a data type, a data size, a security indicator, a performance requirement, cost requirements, a preference, storage location type, and a command.

The method continues at step 108 where the processing module receives a subscription response message that includes a subscription status and saves the subscription status. The subscription status includes one or more of not subscribed indication (e.g., not allowed to disperse store to others), subscribed with direct dispersal (e.g., allowed to send encoded data slices directly to others for storage), subscribed with indirect dispersal (e.g., only allowed to send data to a dispersed storage processing unit for encoding and storing slices), and a targeted storage type (e.g., identifiers of specific other computing devices to utilize).

At step 110, the processing module determines the storage method based on the subscription status, estimated memory availability, a data file type, a data file size, a security indicator, a performance requirement (e.g., retrieval latency), a cost requirement, a preference, and a command. Storage methods include store locally, store indirect, and store direct. For example, the processing module may determine to utilize the store direct method when the subscription status indicates that the processing module was approved to encode and store slices directly to other computing devices and the estimated memory availability for the other computing devices is greater than the data file size by at least a threshold.

At step 112, the processing module stores the data in local memory of the computing device when the subscription response message indicates that a subscription is invalid. At step 114, the processing module outputs the data to a dispersed storage server (e.g., the dispersed storage processing unit) in accordance with the subscription response message, when the subscription response message indicates indirect dispersal. The method branches to step 116 when the processing module determines the dispersal method of the subscription response message indicates direct dispersal.

At step 116, the processing module obtains error coding dispersal storage function parameters. The obtaining may be based on one or more of the subscription status, the subscription response message, estimated memory availability, the data file type, the data file size, the security indicator, the performance requirement (e.g., retrieval latency), the cost requirement, the preference, a lookup, and a command. For example, the processing module determines the parameters for improved reliability to include a relatively larger number of pillars (e.g., n=32) with respect to a relatively low number for a read threshold (e.g., k=10) when the subscription status indicates a relatively low estimated memory availability.

At step 118, the processing module encodes at least a portion of the data in accordance with the error coding dispersal storage function parameters to produce a set of encoded data slices. At step 120, the processing module determines a plurality of storage locations. The plurality of storage locations includes at least one of two or more storage (DS) units and two or more local memories of other computing devices. The processing module determines the storage locations based on one or more of subscription status, estimated memory availability, the data file type, the data file size, the security indicator, the performance requirement (e.g., retrieval latency), the cost requirement, the preference, and a command. For example, the processing module chooses other computing devices that have the lowest estimated retrieval latencies.

At step 122, the processing module performs a dispersed storage write function to store the set of encoded data slices in the plurality of storage locations. The processing module performs the dispersed storage write function by outputting a plurality of write messages to the plurality of storage locations and receiving responses to the plurality of write messages. The processing module saves the responses including which storage locations store which data slices to enable the subsequent retrieval of the data slices. The processing module selects another storage location to replace one of the plurality of storage locations when the processing module receives a negative response to one of the plurality of write messages from one of the plurality of storage locations. The methods to store and retrieve encoded data slices are discussed in greater detail with reference to FIGS. 8-9.

FIG. 8 is a flowchart illustrating an example of storing slices. The method begins at step 124 where a processing module (e.g., associated with a computing device) receives an encoded data slice access request from another computing device. The access request includes an access type including one of storage access, retrieval access, delete access, list access, and digest list. In addition, the access request includes one or more of a slice name, a slice size, a priority indicator, a performance indicator, a security indicator, and an encoded data slice. In an example, the access request includes the storage access type, the encoded data slice, and the slice name associated with the encoded data slice for storage.

The method continues at step 126 where the processing module determines a subscription status regarding the encoded data slice access request. Such a determination may be based on at least one of identifying a subscription status indicator within the encoded data slice access request, a subscription status table lookup, and a query. At step 128, the processing module determines memory status of the computing device, which indicates if the memory is full or how much storage space is available to accept the received slices. Such a determination may be made by a query of local memory in the computing device.

At step 130, the processing module determines a storage approach where the approach may include one of storing at least some of the slices or not storing any of the slices. Such a determination may be based on one or more of a subscription status, slice sizes, available memory, memory status, the priority indicator, the security indicator, the performance indicator, and a computing device activity indicator (e.g., how busy the computing device is). For example, the processing module may determine to store none of the slices when the aggregate of the slice sizes is greater than the computing device available local memory or if the computing device activity indicator indicates that the computing device is too busy to incrementally process storing slices.

The method branches to step 134 when the processing module determines to store slices. The method continues to step 132 where the processing module prepares and sends a reject message to a storage requester when the processing module determines the storage approach to be store none. The reject message includes a list of the slice names not stored such that the requester may determine a next step (e.g., send the slices to another computing device).

At step 134, the processing module accesses an encoded data slice identified in the encoded data slice access request when the subscription status is active. For example, the processing module stores at least some of the slices in one or more of the local computing device memory and/or another computing device memory. The processing module determines how many of the slices to store based on one or more of slice sizes, available memory, memory status, the priority indicator, security indicator, the performance indicator and a computing device activity indicator (e.g., how busy the computing device is). For example, the processing module may store a portion of the slices that is less than all of the slices when the available memory is not greater than the slice sizes by a threshold. The processing module updates a local virtual DSN address (e.g., slice name) to physical location table with the location of the stored slices to facilitate subsequent retrieval. Note that the slices may be stored locally in the computing device memory and/or in an external memory (e.g., in another computing device and/or the DSN memory).

At step 136, the processing module outputs a response message regarding the encoded data slice to the other computing device. The processing module outputs at least one acknowledgement regarding storage of the encoded data slice within the response message when the encoded data slice access request is a write request. In addition, the response message includes a list of the slice names stored and a list of slice names that were not stored such that the requester may determine what next steps (e.g., send the not stored slices to another computing device).

FIG. 9 is a flowchart illustrating an example of retrieving of slices. The method begins at step 138 where a processing module (e.g., of a computing device) receives an encoded data slice access request from another computing device. In an example, the access request includes a retrieve slice request. In addition, the encoded data slice access request may include one or more of slice names, a slice size, a priority indicator, a security indicator, a performance indicator, and a subscription status.

The method continues at step 140 where the processing module determines a subscription status regarding the encoded data slice access request. Such a determination may be based on at least one of identifying a subscription status indicator within the encoded data slice access request, a subscription status table lookup, and a query. The subscription status indicates whether the processing module is active in a subscription as a subscriber or is inactive. The method branches to step 144 when the processing module determines the subscription status to be active. The method continues to step 142 when the processing module determines the subscription status to be inactive. At step 142, the processing module sends a retrieval response message. The retrieval response message includes a list of the slice names not available such that the requester may determine next steps (e.g., retrieve the same or different pillar slices from another computing device).

At step 144, the processing module accesses an encoded data slice identified in the encoded data slice access request when the subscription status is active. In an example, the processing module determines where to retrieve the slices from based on a lookup in the local virtual DSN address (e.g., slice name) to physical location table.

At step 146, the processing module determines a retrieval outcome, which indicates if the retrieval was favorable (e.g., the slices were still present and the integrity is intact) or unfavorable (e.g., missing slices, corrupted slices, tampered slices). Such a determination may be based on one or more of slice names listed in the local virtual DSN address to physical location table, slices present in memory, and verification of a stored integrity check (e.g., a checksum) as compared to a currently calculated integrity check of the encoded data slice. The method branches to step 150 when the processing module determines the retrieval outcome is favorable. The method continues to step 148 when the processing module determines the retrieval outcome to be not favorable. At step 148, the processing module outputs a response message regarding the encoded data slice to the other computing device. The response message includes at least one of an error message and an encoded data slice unavailable message. At step 150, the processing module outputs the encoded data slice within the response message when the encoded data slice access request is a read request and the retrieval outcome is favorable.

Figure 10:
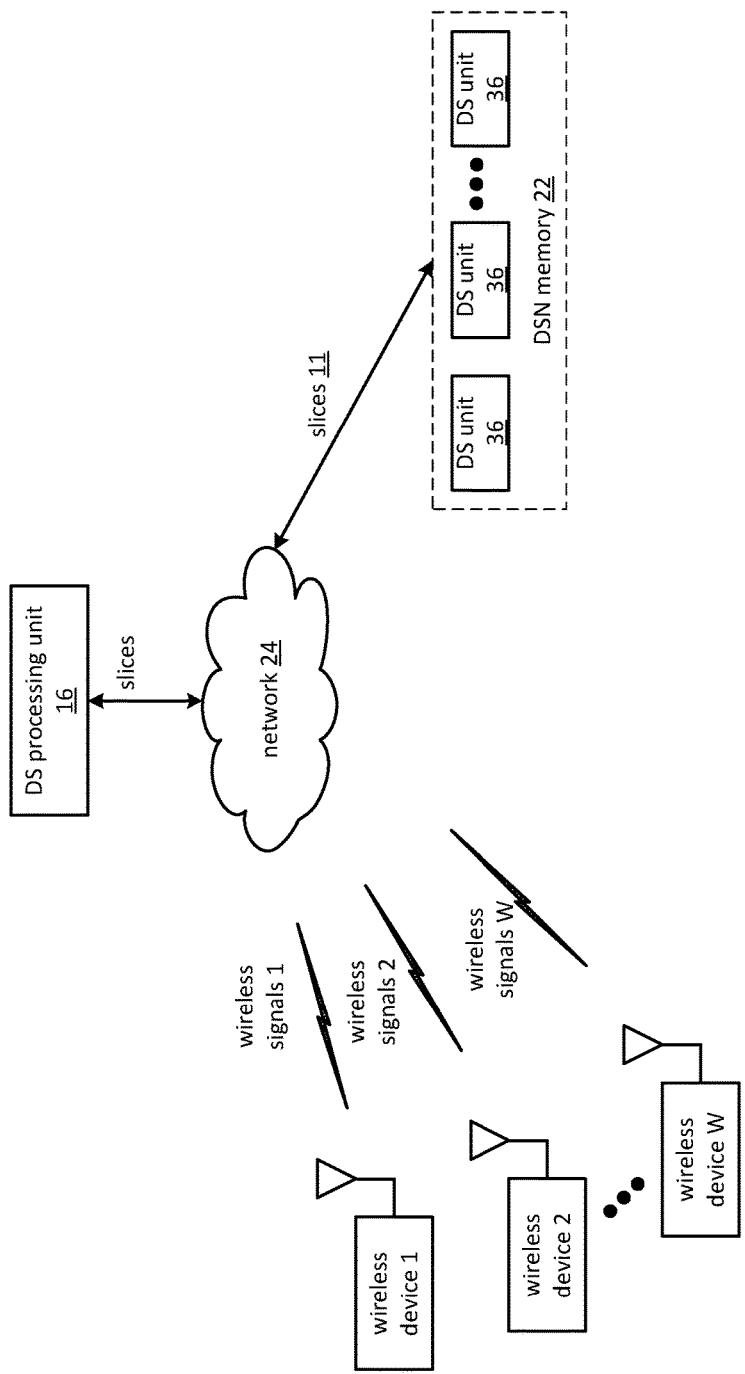
FIG. 10 is a schematic block diagram of another embodiment of a computing system in accordance with the invention.

FIG. 10 is a schematic block diagram of another embodiment of a computing system. As illustrated, system includes a DS processing unit 16, a network 24, a DSN memory 22, and a plurality of wireless devices 1-W. The DSN memory includes a plurality of DS units 36. Note that the system may include two or more DSN memories 22. The wireless devices 1-W may be implemented as a user device and include DS processing. The wireless device may be portable, mobile or fixed. The wireless devices 1-W communicates wireless signals 1-W with the network 24 and may operate in accordance with one or more wireless industry standards including but not limited to universal mobile telecommunications system (UMTS), global system for mobile communications (GSM), long term evolution (LTE), wideband code division multiplexing (WCDMA), IEEE 802.11, IEEE 802.16. The wireless devices 1-W may move from geographic area to area or traverse through a building resulting in varying levels of availability due to drop outs and poor coverage. Portable wireless devices may experience degraded or no operation when the internal battery capacity degrades. Note that as a result, the wireless devices 1-W may not be as available (e.g., with network connectivity) as compared to a wired computing device. Note that the method discussed below addresses the availability to make use of the wireless device in the storing and retrieving of distributedly stored data when the wireless device experiences varying levels of connectivity.

Each of the wireless devices 1-W includes a memory to store EC data slices from the wireless device and/or other wireless devices 1-W. The size of the memory may be configured to store a predetermined amount of EC data slices. In an embodiment, the memory may be partitioned into at least two portions where a first portion is devoted to storing slices for others and a second portion is devoted to storing data that is not slices for others. Note that the partitioning may be changed from time to time based on one or more of a user input, a command, wireless connectivity metrics (e.g., measures of the coverage or battery degradation), and/or a memory utilization indicator (e.g., historical record of actual use). Further note that the wireless devices 1-W may be implemented as a network storage device with a minimum amount of memory portioned for the storing of slices of other wireless devices.

In an example of operation, the wireless device 3 sends a subscription request to the DS processing unit 16 to subscribe as an active participant in the utilization of the plurality of wireless devices 1-W to store and retrieve EC data slices. The wireless device 3 determines to store a data object in one or more of locally (e.g., in the wireless device 3) as a data object file, locally as slices, in other wireless devices 1-W as slices, directly in the DSN memory 22 as slices, and indirectly utilizing the DS processing unit 16 to the DSN memory 22 as slices.

In an example of operation, the DS processing unit 16 receives a subscription request from the wireless device 3, processes it, and sends a subscription request response to the wireless device 3. The response may indicate if the subscription request is granted or not granted. The response may indicate if the wireless device 3 shall send slices directly to other wireless devices 1-W or if the wireless device 3 is to send the data object to the DS processing unit 16 for encoding and dispersal of encoded data slices.

In an example of operation, the DS processing unit 16 determines the subscription request response based on one or more of wireless device ID, an authentication record (e.g., verification that the wireless device is paying for the subscription), a network status indicator (e.g., capacity exists for more slice traffic), and a subscription pool availability indicator (e.g., enough subscribing wireless devices exists to support distributedly storing data). In an instance, the DS processing unit 16 determines to grant the subscription request and enable direct storing of slices to other wireless devices 1-W when the account is paid for the wireless device 3 and subscription pool availability indicator status is favorable (e.g., enough capacity exists).

In another example, wireless device 15 may receive slices from another wireless device (e.g., wireless device 12) with a store slice command. The wireless device 15 determines its subscription status (e.g., previously and still granted permission to participate), memory status (e.g., verification that enough memory is available to store the slices) and the wireless network metrics. The wireless device 15 determines how much of the slices to store based on one or more of the wireless network metrics, the subscription status, the size of the slices, a loading indicator (e.g., is it too busy), and/or memory status. The wireless device 15 may store slices based on the determination. The wireless device 15 sends a message to the another wireless device 12 that sent the slices to indicate the status of the slices (e.g., stored, not stored).

In another example, wireless device 15 may receive a slice retrieval command from another wireless device 12 where the retrieval command includes slice names. The wireless device 15 determines the wireless connectivity metrics and its subscription status (e.g., previously and still granted permission to participate). The wireless device 15 attempts to retrieve the slices when the subscription status is still active. The wireless device 15 may verify that the slices are as they were stored (e.g., checksum integrity test). The wireless device 15 sends slices to the another wireless device 12 that requested retrieval of the slices when the slice verification is favorable (e.g., as they were originally stored).

In another example of operation, wireless device 2 sends a subscription request to the DS processing unit 16 when it has a file to store. The wireless device 2 creates EC data slices of the data file and sends them to wireless devices 3-9 for storage when the DS processing unit 16 grants the wireless device 2 the subscription request to send slices directly to other wireless devices. The subscribing wireless devices 3-9 store the slices they receive from the wireless device 2 when they have available memory and when the wireless connectivity metrics are favorable. The subscribing wireless devices 3-9 send storage confirmations to the wireless device 2 for the slices stored. The wireless device 2 saves the locations (e.g., wireless device IDs) of the stored slices for use during subsequent retrieval. Wireless devices 3-9 send the slices to the wireless device 2 when receiving a retrieval command from wireless device 2 and the wireless devices 3-9 have sufficient capacity to execute the retrieval and the wireless connectivity metrics are favorable. The wireless devices 1-W method to distribute, store, and retrieve slices is discussed in greater detail with reference to FIGS. 11-13.

Figure 11:
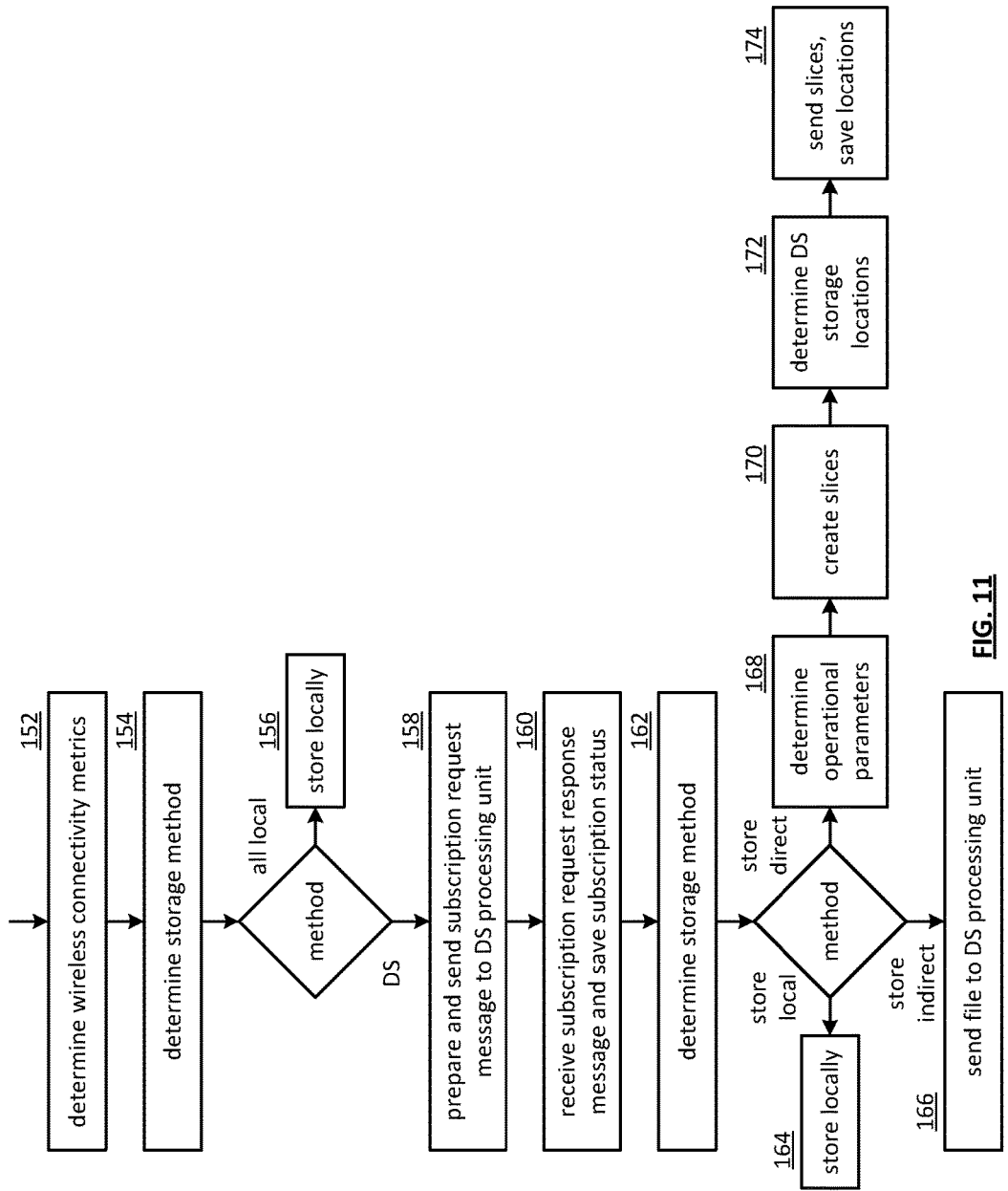
FIG. 11 is a flowchart illustrating another example of distributing slices in accordance with the invention.

FIG. 11 is a flowchart illustrating another example of distributing slices. The method begins at step 152 where a wireless device determines the wireless connectivity metrics when the wireless device has a data file to store. The wireless connectivity metrics may include one or more of average bit rate, peak bit rate, lowest bit rate, estimated sustained bandwidth, connectivity uptime, network availability, availability based on location, current location, and estimated future location. Such a determination may be based on measuring the metrics and/or a lookup of previously stored metrics. In an example, the wireless device is continuously measuring the metrics and saving the measurement results in local memory.

At step 154, wireless device determines a storage method where the storage method includes storing the data file locally in the wireless device as a data file or storing EC data slices of the data file in wireless devices and/or the DSN memory. Such a determination may be based on one of more of the wireless connectivity metrics, a data file type (e.g., video, music, text, etc.), a data file size, a security indicator, a performance requirement (e.g., retrieval latency), a cost requirement, a preference, and a command. For example, the wireless device determines to store locally when the wireless connectivity metrics fall below desired thresholds. In this instance, the slices may be difficult to subsequently retrieve if the wireless connectivity is poor. The method branches to step 158 when the wireless device determines the storage method to include dispersal. The method continues to step 156 when the wireless device determines the storage method to be all local. At step 156, the wireless device stores the data file locally (e.g., in a local memory of the wireless device) when the wireless device determines the storage method to be store locally.

At step 158, the wireless device prepares and sends a subscription request message to the DS processing unit when the wireless device determines the storage method to be storing EC data slices of the data file in wireless devices and/or the DSN memory. The subscription request message may include one or more of a subscription request command, the wireless device ID, the wireless connectivity metrics, the data file type, the data file size, the security indicator, the performance requirement (e.g., retrieval latency), the cost requirement, the preference, and a command.

Next, the DS processing unit determines a subscription request response based on one or more of the subscription request command, the wireless device ID, the wireless connectivity metrics, the data file type, the data file size, the security indicator, the performance requirement (e.g., retrieval latency), the cost requirement, the preference, estimated security, estimated performance, estimated cost, estimated memory availability, and a command. The subscription request response may include one or more of subscription approved or not approved, a minimum threshold of operation of the wireless connectivity metrics, approved to store slices indirectly by sending the data file to the DS processing unit (e.g., the DS processing unit creates and stores the EC data slices), approved to create and store slices directly to other wireless devices, estimated memory availability (e.g., amount of memory and uptime of the other wireless devices), and/or the DSN memory. The DS processing unit sends a subscription request response message to the wireless device that includes the subscription request response.

At step 160, the wireless device receives the subscription request response message and saves the subscription request response as the subscription status. At step 162, the wireless device determines the storage method based on one or more of the subscription status, the wireless connectivity metrics, estimated memory availability, the data file type, the data file size, the security indicator, the performance requirement (e.g., retrieval latency), the cost requirement, the preference, and a command. The storage methods include store locally, store indirect, and store direct. For example, the wireless device may determine the store direct method when the subscription status indicates that the wireless device was approved to create and store slices directly to other wireless devices, the estimated memory availability for the other wireless devices is greater than the data file size by at least a threshold, and the wireless connectivity metrics indicate favorable conditions (e.g., above the minimum threshold). The method branches to step 164 when the wireless device determines the storage method to be store locally. At step 164, the wireless device stores the data file locally in the wireless device when the wireless device determines the storage method to be store locally. The method branches to step 166 when the wireless device determines the storage method to include store indirect. At step 166, the wireless device sends the data file to the DS processing unit when the wireless device determines the storage method to be store indirectly. The method continues to step 168 when the wireless device determines the storage method to be store direct.

At step 168, the wireless device determines the operational parameters when the wireless device determines the storage method to be store directly. Such a determination may be based on one or more of the subscription status, the wireless connectivity metrics, estimated memory availability, the data file type, the data file size, the security indicator, the performance requirement (e.g., retrieval latency), the cost requirement, the preference, and a command. For example, the wireless device determines the operational parameters to include a relatively larger number of pillars (e.g., n=32) with respect to a read threshold with a relatively low number (e.g., 10) when the wireless connectivity metrics indicate unfavorable connectivity. In this instance, the wireless device chooses operational parameters with improved reliability.

At step 170, the wireless device creates EC data slices of the data file in accordance with the operational parameters and an error coding dispersal storage function. At step 172, the wireless device determines the DS storage locations based on one or more of subscription status, the wireless connectivity metrics, estimated memory availability, the data file type, the data file size, the security indicator, the performance requirement (e.g., retrieval latency), the cost requirement, the preference, and a command. For example, the wireless device may choose other wireless devices that have the lowest estimated retrieval latencies and best wireless connectivity metrics.

At step 174, the wireless device sends the EC data slices to the determined wireless devices with a storage command. The wireless device receives confirmation of storage messages from the wireless devices that store the slices. The wireless device saves the wireless device IDs of wireless devices where the wireless device received confirmation of storage messages. The wireless device may utilize the wireless device IDs to subsequently retrieve the EC data slices. The wireless device methods to store and retrieve slices are discussed in greater detail with reference to FIGS. 12-13.

Figure 12:
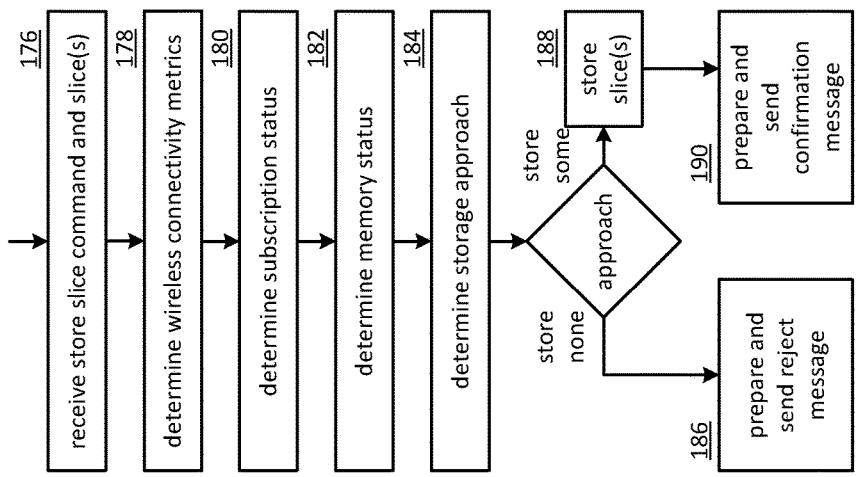
FIG. 12 is a flowchart illustrating another example of storing slices in accordance with the invention.

FIG. 12 is a flowchart illustrating another example of storing slices. The method begins at step 176 where a wireless device receives a store slice command, slice names, slice sizes, a priority indicator, and slices(s) from one of the wireless device, a DS processing unit, a storage integrity processing unit, a DS managing unit, and a DS unit. At step 178, the wireless device determines wireless connectivity metrics. The wireless connectivity metrics includes one or more of average bit rate, peak bit rate, lowest bit rate, estimated sustained bandwidth, connectivity uptime, network availability, availability based on location, current location, and estimated future location. Such a determination may be based on measuring the metrics and/or a lookup of previously stored metrics. In an example, the wireless device is continuously measuring the metrics and saving the measurement results in local memory of the wireless device.

At step 180, the wireless device determines a subscription status, which indicates whether the wireless device is engaged in a subscription as an active subscriber or not. Such a determination may be made by checking the previously saved subscription status from a subscription sequence or based on information received in the store slice command. At step 182, the wireless device determines a memory status of the wireless device, which indicates if the memory is full or how much storage space is available to accept the received slices. Such a determination may be made by a query of the memory in the wireless device or by a lookup.

At step 184, the wireless device determines a storage approach where the approach may include to store at least some of the slices or to store none of the slices. Such a determination may be based on one or more of the wireless connectivity metrics, the slice sizes, the available memory, memory status, the priority indicator, and a wireless device activity indicator (e.g., how busy the wireless device is). For example, the wireless device may determine to store none of the slices when the aggregate of the slice sizes is greater than the wireless device available memory or if the wireless device activity indicator indicates that the wireless device is too busy to incrementally process storing slices or if the wireless connectivity metrics are unfavorable for reliable subsequent slice retrievals (e.g., the wireless link is too unstable, the wireless connectivity metrics do not meet the minimum threshold, the battery is too low). The method branches to step 188 when the wireless device determines the storage approach to be store some. The method continues to step 186 when the wireless device determines the storage approach to be store none. At step 186, the wireless device prepares and sends a reject message to the storage requester (e.g., the DS processing). The reject message includes a list of the slice names not stored such that the requester may determine a next step (e.g., send the slices to another wireless device).

At step 188, the wireless device stores at least some of the slices in one or more of the local wireless device memory and/or another wireless device memory when the wireless device determines the storage approach to be store some. The wireless device updates a local virtual DSN address (e.g., slice name) to physical location table with the location of the stored slices to facilitate a subsequent retrieval. Note that the slices may be stored locally in the wireless device memory and/or in an external memory (e.g., in another wireless device and/or the DSN memory).

The wireless device may determine how many of the slices to store based on one or more of the wireless connectivity metrics, the slice sizes, the available memory, memory status, the priority indicator, and a wireless device activity indicator (e.g., how busy the wireless device is). For example, the wireless device may store a portion of the slices less than all of the slices when the available memory is not greater than the slice sizes by a threshold. In another example, the wireless device may only store the highest priority slices when the wireless connectivity metrics are unfavorable.

At step 190, the wireless device prepares and sends a confirmation message to the storage requester (e.g., the DS processing). The confirmation message includes a list of the slice names stored and any slice names that were not stored such that the requester may determine what to do next (e.g., send the not stored slices to another wireless device).

Figure 13:
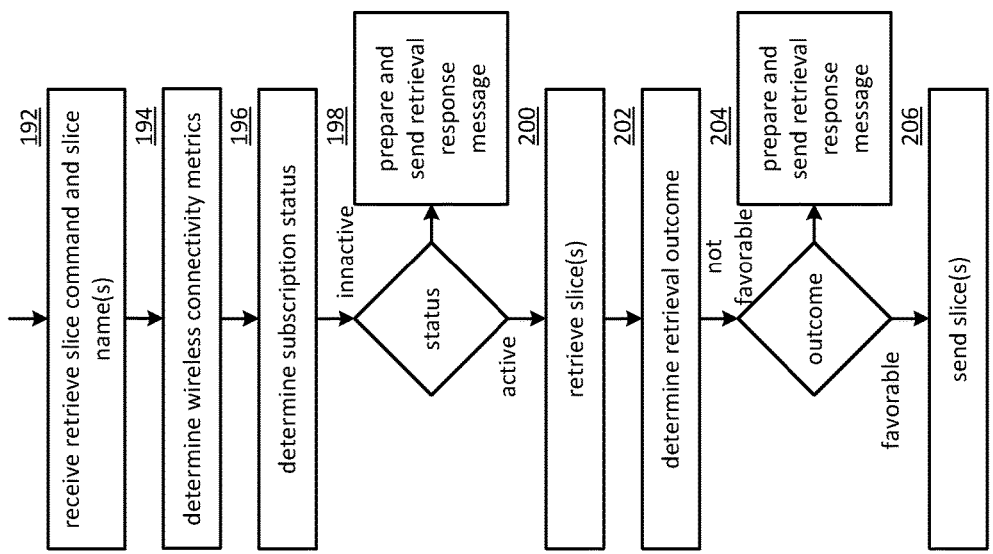
FIG. 13 is a flowchart illustrating another example of retrieving slices in accordance with the invention.

FIG. 13 is a flowchart illustrating another example of retrieving slices. The method begins with step 192 where a wireless device receives a retrieve slice command, slice names, and a priority indicator from one or more of the wireless device, a DS processing unit, a storage integrity processing unit, a DS managing unit, and a DS unit. At step 194, the wireless device determines wireless connectivity metrics. The wireless connectivity metrics includes one or more of average bit rate, peak bit rate, lowest bit rate, estimated sustained bandwidth, connectivity uptime, network availability, availability based on location, current location, and estimated future location. Such a determination may be based on measuring the metrics and/or a lookup of previously stored metrics. In an example, the wireless device is continuously measuring the metrics and saving the measurement results in local memory.

At step 196, the wireless device determines a subscription status, which indicates whether the wireless device is active in a subscription as a subscriber or inactive. Such a determination may be based on checking the previously saved subscription status from a subscription sequence or by utilizing information contained in the retrieve slice command. For example, the wireless device determines the subscription status to be inactive when the wireless connectivity metrics are unfavorable even if the wireless device is an approved subscriber. The method branches to step 200 when the wireless device determines the subscription status to be active. The method continues to step 198 when wireless device determines the subscription status to be inactive. At step 198, the wireless device prepares and sends a retrieval response message. The retrieval response message includes a list of the slice names not available from this wireless device ID such that the requester may determine a next step (e.g., retrieve the same or different pillar slices from another wireless device).

At step 200, the wireless device retrieves the slices when the wireless device determines the subscription status to be active. In an instance, the wireless device determines where to retrieve the slices from based on a lookup in the local virtual DSN address (e.g., slice name) to physical location table. Note that the slices may be stored locally in the wireless device memory and/or in an external memory (e.g., in another wireless device and/or the DSN memory).

At step 202, the wireless device determines a retrieval outcome, which indicates whether the retrieval was favorable (e.g., the slices were still present and the integrity is intact) or unfavorable (e.g., missing slices, corrupted slices, tampered slices). Such a determination may be based on one or more of slice names listed in the local virtual DSN address to physical location table, slices present in memory, and verification of a stored checksum compared to a currently calculated checksum of the slice. The method branches to step 206 when the wireless device determines the retrieval outcome to be favorable. The method continues to step 204 when the wireless device determines the retrieval outcome to be not favorable. At step 204, the wireless device sends a retrieval response. At step 204, the wireless device prepares and sends a retrieval response message to the retrieval requester (e.g., the DS processing). The retrieval response message includes a list of the slice names not available from this wireless device ID such that the requester may determine a next step (e.g., retrieve the same or different pillar slices from another wireless device). At step 206, the wireless device sends the slices to the requester.

Figure 14:
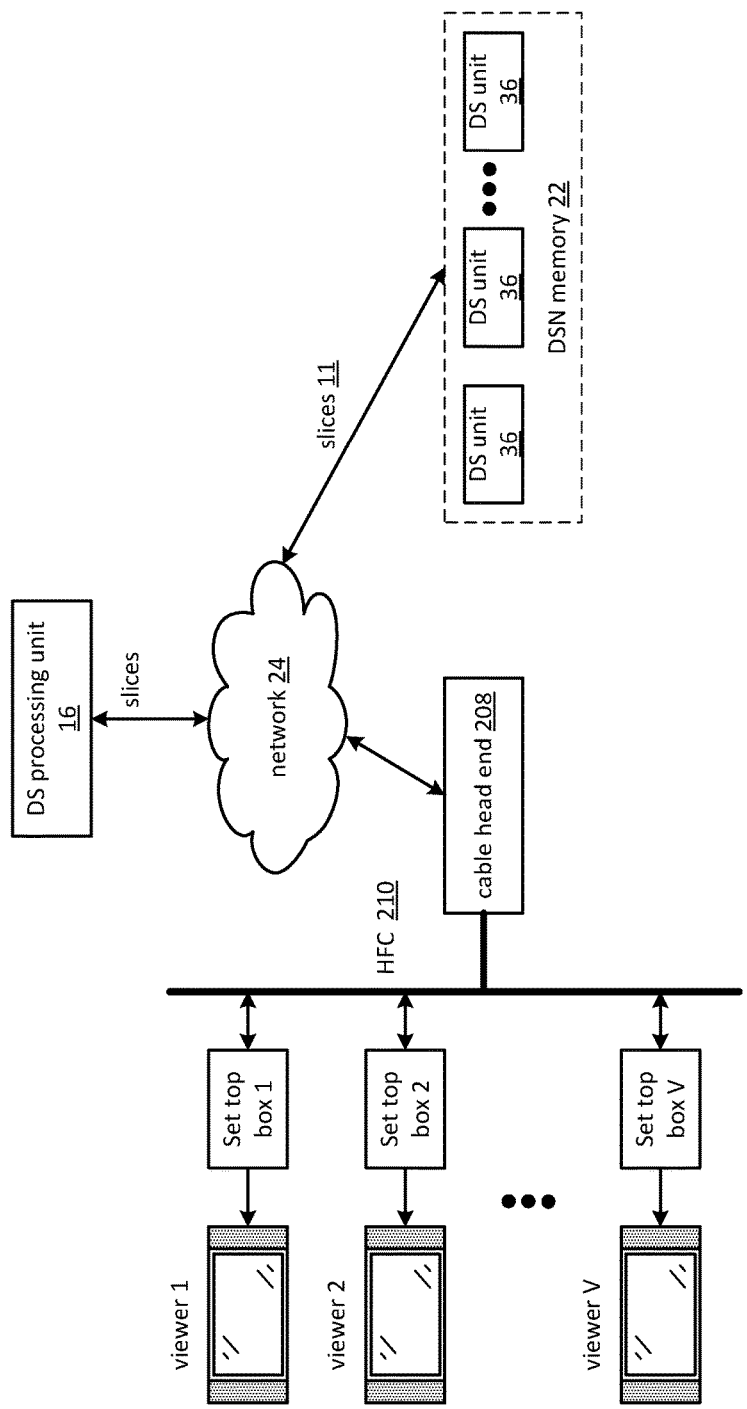
FIG. 14 is a schematic block diagram of another embodiment of a computing system in accordance with the invention.

FIG. 14 is a schematic block diagram of another embodiment of a computing system. As illustrated, system includes a DS processing unit 16, a network 24, a DSN memory 22, a cable head end 208, a hybrid fiber coax (HFC) distribution 210, a plurality of viewers 1-V, and a plurality of set top boxes 1-V. The DSN memory 22 includes a plurality of DS units 36. Note that the system may include two or more DSN memories. The cable head end 208 sources broadcast, multicast, and/or unicast content via the HFC distribution to the plurality of set top boxes 1-V. In another example, a satellite receiving system may substitute the cable head end 208 and/or HFC 210. In yet another example, a content server (e.g., on the internet) and network connection may substitute the cable head end 208 and/or HFC 210.

The set top boxes 1-V may comprise the computing core 26, a memory, and a DS processing 34 to transform media into slices for storage and retrieve slices, de-slice, and decode to produce media for viewing. The DS processing may utilize the memory to store content including content in the form of slices. The set top boxes 1-V select content from the cable head end 208 (e.g., broadcast/multicast or on-demand video over cable, satellite and/or the internet), stored content from the memory, stored content in other set top boxes 1-V, and/or content from the DSN memory 22. Note that the set top box may function as a DS unit 36 to store slices 11.

The viewers 1-V may reproduce media (e.g., video, audio, pictures, web content) output from the set top boxes 1-V. For example, the viewers 1-V may comprise a flat panel television and may include a display and speakers to reproduce the media. In another example, the functions of the set top box and viewer are integrated together. In an instance, the viewers 1-V may connect either directly to other viewers 1-V and/or the DSN memory 22 to store and retrieve media slices 11.

The set top boxes 1-V determine which portion of the content to store in memory. For example, the viewer and/or set top box may be operated to record or store in memory the 5:30 pm evening news on cable channel 188 on October 18 such that the viewer may subsequently access the content. The set top boxes 1-V determine which content element (e.g., a portion of content such as a particular show or program) stored in the memory to distributedly store. Such a determination may be based on one or more of a command, a command from the cable head end 208, a command from at least one other set top box, a memory utilization indicator, and a predetermination. For example, the set top boxes 1-V determine to distributedly store a movie when the memory utilization indicator is above a threshold (e.g., indicating that the memory is almost full).

The set top boxes 1-V communicate with the network 24 and may operate in accordance with one or more cable industry standards including but not limited to data over cable service interface specification (DOCSIS). The set top boxes 1-V may be operably coupled to the cable head end 208 through a series of coax cables, connectors, power splitters, amplifiers, fiber that are prone to failures due to many possible causes including weather, construction, landscaping, etc. The set top boxes 1-V may experience degraded or no operation when failures occur in the HFC 210. Note that as a result, the set top boxes 1-V may not be as available (e.g., with network connectivity) as compared to a DSN memory 22 when implemented in a robust information technology (IT) data center. Note that the set top boxes 1-V may experience varying levels of bandwidth connectivity with other set top boxes in the same building, in the same neighborhood, and in the same cable system. Generally, the bandwidth may be higher between set top boxes in closer proximity.

Each of the set top boxes 1-V includes memory to store EC data slices from the set top box and/or other set top boxes 1-V. The size of the memory may be configured to store a predetermined amount of EC data slices. In an example, the memory may be partitioned into at least two portions where a first portion is devoted to storing slices for others and a second portion is devoted to storing data that is not slices for others. Note that the partitioning may be changed from time to time based on one or more of a user input, a command, cable network parameters (e.g., measures of the cable system performance), and a memory utilization indicator (e.g., historical record of actual use). Further note that the set top boxes 1-V may be implemented as a network storage device with a minimum amount of memory portioned for the storing of slices of other set top boxes.

In an example of operation, set top box 3 sends a subscription request to the DS processing unit 16 to subscribe as an active participant in the utilization of the plurality of set top boxes 1-V to store and retrieve EC data slices. The set top box 3 determines to store a data object in one or more of locally (e.g., in the set top box) as a data object file, locally as slices, in other set top boxes 1-V (e.g., set top boxes in the same building, in the same neighborhood, in the same cable system) as slices, directly in the DSN memory 22 as slices, and/or indirectly utilizing the DS processing unit 16 to encode and distribute slices 11 to the DSN memory 22.

In the example, the DS processing unit 16 receives the subscription request from the set top box 3, processes it, and sends a subscription request response to the set top box 3. The response may indicate if the subscription request is granted or not granted. In addition, the response may indicate if the set top box 3 shall send slices directly to other set top boxes 1-V or if the set top box 3 is to send the data object to the DS processing unit 16 for encoding into slices 11 for dispersal. The DS processing unit 16 determines the subscription request response based on one or more of set top box ID, an authentication record (e.g., verification that the set top box is paying for the subscription), a network status indicator (e.g., capacity exists for more slice traffic), and a subscription pool availability indicator (e.g., enough subscribing set top boxes exists to support distributedly storing data). For example, the DS processing unit 16 determines to grant the subscription request and enable direct storing of slices to other set top boxes when the account is paid for the set top box 3 and subscription pool availability indicator status is favorable (e.g., enough capacity exists).

In the example, set top box 15 receives slices from set top box 3 with a store slice command. The set top box 15 determines its subscription status (e.g., previously and still granted permission to participate), memory status (e.g., verification that enough memory is available to store the slices) and the cable network parameters. The set top box 15 determines how much of the slices to store based on one or more of the cable network parameters, the subscription status, the size of the slices, a loading indicator (e.g., is it too busy), and memory status. The set top box 15 stores slices based on the determination. The set top box 15 sends a message to the set top box 3 that sent the slices to indicate the status of the slices (e.g., stored, not stored).

In another example, the set top box 15 may receive a slice retrieval command from set top box 3 with slice names. The set top box 15 determines the cable network parameters and its subscription status (e.g., previously and still granted permission to participate). The set top box 15 attempts to retrieve the slices when the subscription status is still active. The set top box 15 verifies that the slices are as they were stored (e.g., checksum integrity test). The set top box 15 sends slices to the set top box 3 that requested retrieval of the slices when the slice verification is favorable (e.g., as they were originally stored).

In another example of operation, set top box 2 sends a subscription request to the DS processing unit 16 when it has a file to store. The set top box to creates EC data slices of the data file and sends them to set top boxes 3-9 for storage when the DS processing unit 16 grants the set top box 2 the subscription request to send slices directly to other set top boxes and the cable network parameters are favorable to set top boxes 3-9 (e.g., the set top boxes are close to the set top box 2 and the cable system operation is favorable). The subscribing set top boxes 3-9 store the slices they receive from the set top box 2 when they have available memory and when the cable network parameters are favorable. The subscribing set top boxes 3-9 send storage confirmations to the set top box 2 for the slices stored. The set top box 2 saves the locations (e.g., set top box IDs) of the stored slices for use during subsequent retrieval. Set top boxes 3-9 send the slices to the set top box 2 when receiving a retrieval command from set top box 2 and the set top boxes 3-9 have sufficient capacity to execute the retrieval and the cable network parameters are favorable. The set top boxes 1-V method to distribute, store, and retrieve slices is discussed in greater detail with reference to FIGS. 15-17.

Figure 15:
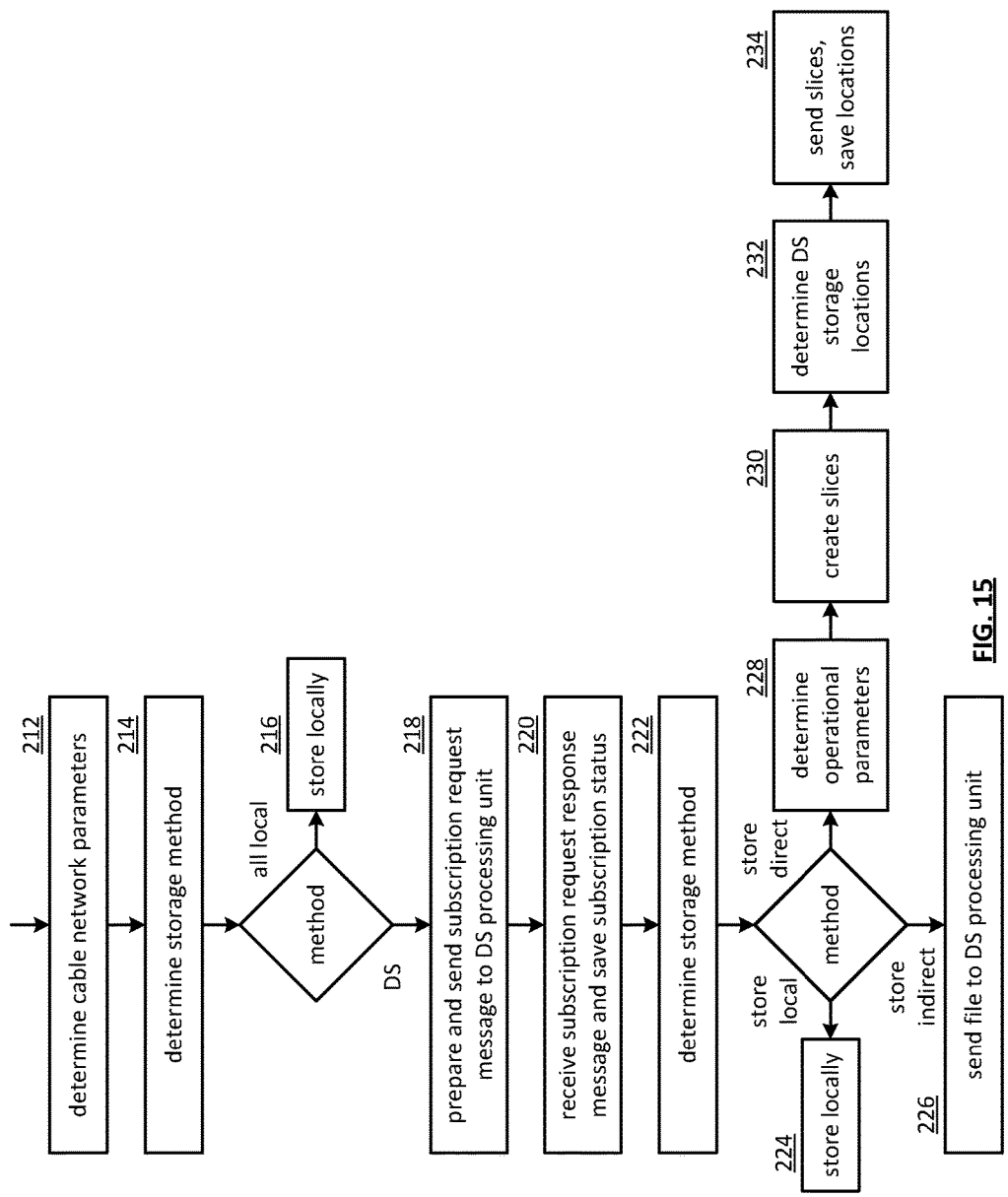
FIG. 15 is a flowchart illustrating another example of distributing slices in accordance with the invention.

FIG. 15 is a flowchart illustrating another example of distributing slices. The method begins with step 212 where a set top box determines cable network parameters when the set top box has a data file to store. The cable network parameters may include one or more of cable system architecture, a proximal indicator for other set top boxes (e.g., same building, neighborhood, city, etc.), a set top box affiliation group (e.g., set top box ID list) with the current set top box, access restrictions, average bit rate, peak bit rate, lowest bit rate, estimated sustained bandwidth, connectivity uptime, and network availability. Such a determination may be based on measuring the metrics and/or a lookup of previously stored metrics. In an example, the set top box continuously measures the metrics and saving the measurement results in local memory.

At step 214, the set top box determines a storage method where the storage method includes storing the data file locally in the set top box as a data file or storing EC data slices of the data file in set top boxes and/or the DSN memory. Such a determination may be based on one of more of, but not limited to the cable network parameters, a data file type (e.g., video, music, text, etc.), a data file size, a security indicator, a performance requirement (e.g., retrieval latency), a cost requirement, a preference, and a command. For example, the set top box determines to store locally when the cable network parameters fall below desired thresholds. In an instance, the slices may be difficult to subsequently retrieve if the wireless connectivity is poor. In another example, the set top box determines to store slices in other set top boxes when the cable network parameters indicate other set top boxes with performance parameters above minimum thresholds. The method branches to step 218 when the set top box determines the storage method to include dispersal. The method continues to step 216 when the set top box determines the storage method to be all local. At step 216, the set top box stores the data file locally.

At step 218, the set top box prepares and sends a subscription request message to the DS processing unit when the set top box determines the storage method to be storing EC data slices of the data file in set top boxes and/or the DSN memory. The subscription request message may include one or more of a subscription request command, the set top box ID, the cable network parameters, the data file type, the data file size, the security indicator, the performance requirement (e.g., retrieval latency), the cost requirement, the preference, and a command. The DS processing unit determines a subscription request response based on one or more of the subscription request command, the set top box ID, the cable network parameters, the data file type, the data file size, the security indicator, the performance requirement (e.g., retrieval latency), the cost requirement, the preference, estimated security, estimated performance, estimated cost, estimated memory availability, and a command. The subscription request response may include one or more of subscription approved or not approved, a minimum threshold of operation of the cable network parameters, approved to store slices indirectly by sending the data file to the DS processing unit (e.g., the DS processing unit creates and stores the EC data slices), approved to create and store slices directly to other set top boxes, estimated memory availability (e.g., amount of memory and uptime of the other set top boxes), and the DSN memory. The DS processing unit sends the subscription request response message to the set top box that includes the subscription request response.

At step 220, the set top box receives the subscription request response message and saves the subscription request response as the subscription status. At step 222, the set top box determines a storage method based on the subscription status, the cable network parameters, estimated memory availability, the data file type, the data file size, the security indicator, the performance requirement (e.g., retrieval latency), the cost requirement, the preference, and a command. The storage methods include store locally, store indirect, and store direct. For example, the set top box may determine the store direct method when the subscription status indicates that the set top box was approved to create and store slices directly to other set top boxes, the estimated memory availability for the other set top boxes is greater than the data file size by at least a threshold, and the cable network parameters indicate favorable conditions (e.g., above the minimum threshold). The method branches to step 224 when the set top box determines the storage method to be store local. At step 224, the set top box stores the data file locally in the set top box. The method branches to step 226 when the set top box determines the storage method to be store indirect. At step 226, the set top box sends the data file to the DS processing unit for encoding and disperse storing slices. The method continues to step 228 when the set top box determines the storage method to be store direct.

At step 228, the set top box determines the operational parameters. Such a determination may be based on one or more of the subscription status, the cable network parameters, estimated memory availability, the data file type, the data file size, the security indicator, the performance requirement (e.g., retrieval latency), the cost requirement, the preference, and a command. For example, the set top box determines the operational parameters to include a relatively larger number of pillars (e.g., n=32) with respect to a read threshold with a relatively low number (e.g., 10) when the cable network parameters indicate unfavorable connectivity. In this instance, the set top box chooses operational parameters with improved reliability.

At step 230, the set top box creates EC data slices of the data file in accordance with the operational parameters utilizing an error coding dispersal storage function. At step 232, the set top box determines DS storage locations based on one or more of subscription status, the cable network parameters, estimated memory availability, the data file type, the data file size, the security indicator, the performance requirement (e.g., retrieval latency), the cost requirement, the preference, and a command. For example, the set top box may choose other set top boxes that have the lowest estimated retrieval latencies (e.g., set top boxes in the same building) and best cable network parameters.

At step 234, the set top box sends the EC data slices to the determined storage locations (e.g., other set top boxes) with a store command. The set top box receives confirmation of storage messages from the set top boxes that store the slices. The set top box saves the set top box identifiers of set top boxes where the set top box received confirmation of storage messages. The set top box may utilize the set top box identifiers to subsequently retrieve the EC data slices. The set top box methods to store and retrieve slices are discussed in greater detail with reference to FIGS. 16-17.

Figures 16, 17:
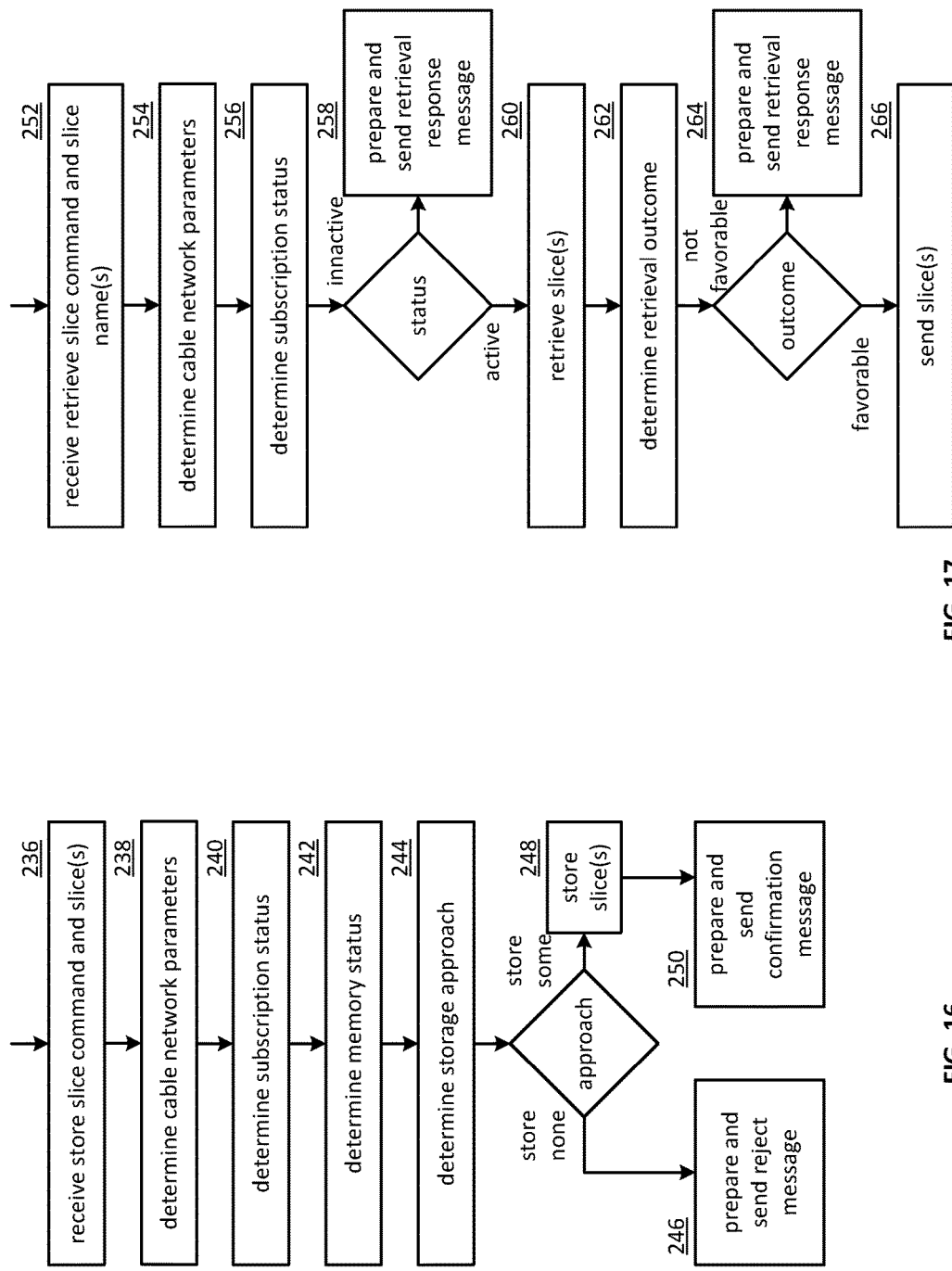
FIG. 16 is a flowchart illustrating another example of storing slices in accordance with the invention.
FIG. 17 is a flowchart illustrating another example of retrieving slices in accordance with the invention.

FIG. 16 is a flowchart illustrating another example storing slices. The method begins with step 236 where a set top box receives a store slice command, slice names, slice sizes, a priority indicator, and slices(s) from one or more of the set top box, a DS processing unit, a storage integrity processing unit, a DS managing unit, and/or the DS unit. At step 238, the set top box determines the cable network parameters. The cable network parameters may include one or more of cable system architecture, a proximal indicator for other set top boxes (e.g., same building, neighborhood, city, etc.), a set top box affiliation group (e.g., set top box ID list) with the current set top box, access restrictions, average bit rate, peak bit rate, lowest bit rate, estimated sustained bandwidth, connectivity uptime, and network availability. Such a determination may be based on measuring the metrics and/or a lookup of previously stored metrics. In an example, the set top box is continuously measuring the metrics and saving the measurement results in local memory.

At step 240, the set top box determines a subscription status which indicates whether the set top box is engaged in a subscription as an active subscriber or not. Such a determination may be made by checking the previously saved subscription status from a subscription sequence. At step 242, the set top box determines a memory status of the set top box which indicates if the memory is full or how much storage space is available to accept the received slices. Such a determination may be made by a query of the memory in the set top box and/or by a lookup.

At step 244, the set top box determines a storage approach where the approach may include to store at least some of the slices or to store none of the slices. Such a determination may be based on one or more of the cable network parameters, slice sizes, available memory, memory status, the priority indicator, and a set top box activity indicator (e.g., how busy the set top box is). For example, the set top box determines to store none of the slices when the aggregate of the slice sizes is greater than the set top box available memory or if the set top box activity indicator indicates that the set top box is too busy to incrementally process storing slices or if the cable network parameters are unfavorable for reliable subsequent slice retrievals (e.g., the HFC system is too unstable, the cable network parameters do not meet the minimum threshold). The method branches to step 248 when the set top box determines the storage approach to be store some. The method continues to step 246 when the set top box determines the storage approach to be store none. At step 246, the set top box prepares and sends a reject message to the storage requester (e.g., the DS processing in another set top box). The reject message includes a list of the slice names not stored such that the requester may determine a next step (e.g., send the slices to another set top box).

At step 248, the set top box stores at least some of the slices in one or more of the local set top box memory and/or another set top box memory. The set top box may update a local virtual DSN address (e.g., slice name) to physical location table with the location of the stored slices to facilitate subsequent retrieval. Note that the slices may be stored locally in the set top box memory and/or in an external memory (e.g., in another set top box and/or the DSN memory). The set top box determines how many of the slices to store based on one or more of the cable network parameters, the slice sizes, the available memory, memory status, the priority indicator, and a set top box activity indicator (e.g., how busy the set top box is). For example, the set top box may store a portion of the slices less than all of the slices when the available memory is not greater than the slice sizes by a threshold. In another example, the set top box may only store the highest priority slices when the cable network parameters are unfavorable.

At step 250, the set top box prepares and sends a confirmation message to the storage requester (e.g., the DS processing of another set top box). The confirmation message includes a list of the slice names stored and any slice names that were not stored such that the requester may determine what to do next (e.g., send the not stored slices to another set top box).

FIG. 17 is a flowchart illustrating another example of retrieving slices. The method begins with step 252 where a set top box receives a retrieve slice command, slice names, and a priority indicator from one or more of the set top box, a DS processing unit, a storage integrity processing unit, a DS managing unit, and/or the DS unit. At step 254, the set top box determines cable network parameters. The cable network parameters may include one or more of cable system architecture, a proximal indicator for other set top boxes (e.g., same building, neighborhood, city, etc), a set top box affiliation group (e.g., set top box ID list) with the current set top box, access restrictions, average bit rate, peak bit rate, lowest bit rate, estimated sustained bandwidth, connectivity uptime, and network availability. Such a determination may be based on measuring the metrics and/or a lookup of previously stored metrics. In an example, the set top box is continuously measuring the metrics and saving the measurement results in local memory.

At step 256, the set top box determines a subscription status which indicates whether the set top box is active in a subscription as a subscriber or inactive. Such a determination may be made by checking the previously saved subscription status from a subscription sequence. For example, the set top box determines the subscription status to be inactive when the cable network parameters are unfavorable even if the set top box is an approved subscriber. The method branches to step 260 when the set top box determines the subscription status to be active. The method continues to step 258 when the set top box determines the subscription status to be inactive. At step 258, the set top box prepares and sends a retrieval response message to the retrieval requester (e.g., the DS processing). The retrieval response message includes a list of the slice names not available from this set top box ID such that the requester may determine a next step (e.g., retrieve the same or different pillar slices from another set top box).

At step 260, the set top box retrieves the slices when the set top box determines the subscription status to be active. The set top box determines where to retrieve the slices from based on a lookup in the local virtual DSN address (e.g., slice name) to physical location table. Note that the slices may be stored locally in the set top box memory and/or in an external memory (e.g., in another set top box and/or the DSN memory).

At step 262, the set top box determines a retrieval outcome which indicates if the retrieval was favorable (e.g., the slices were still present and the integrity is intact) or unfavorable (e.g., missing slices, corrupted slices, tampered slices). Such a determination may be based on one or more of slice names listed in the local virtual DSN address to physical location table, slices present in memory, and verification of a stored checksum compared to a currently calculated checksum of the slice. The method branches to step 266 when the set top box determines the retrieval outcome to be favorable. The method continues to step 264 when the set top box determines the retrieval outcome to be not favorable. At step 264, the set top box prepares and sends a retrieval response message to the retrieval requester (e.g., the DS processing). The retrieval response message includes a list of the slice names not available from this set top box ID such that the requester may determine a next step (e.g., retrieve the same or different pillar slices from another set top box). At step 266, the set top box sends the slices to the requester when the set top box determines the retrieval outcome to be favorable.

Figure 18:
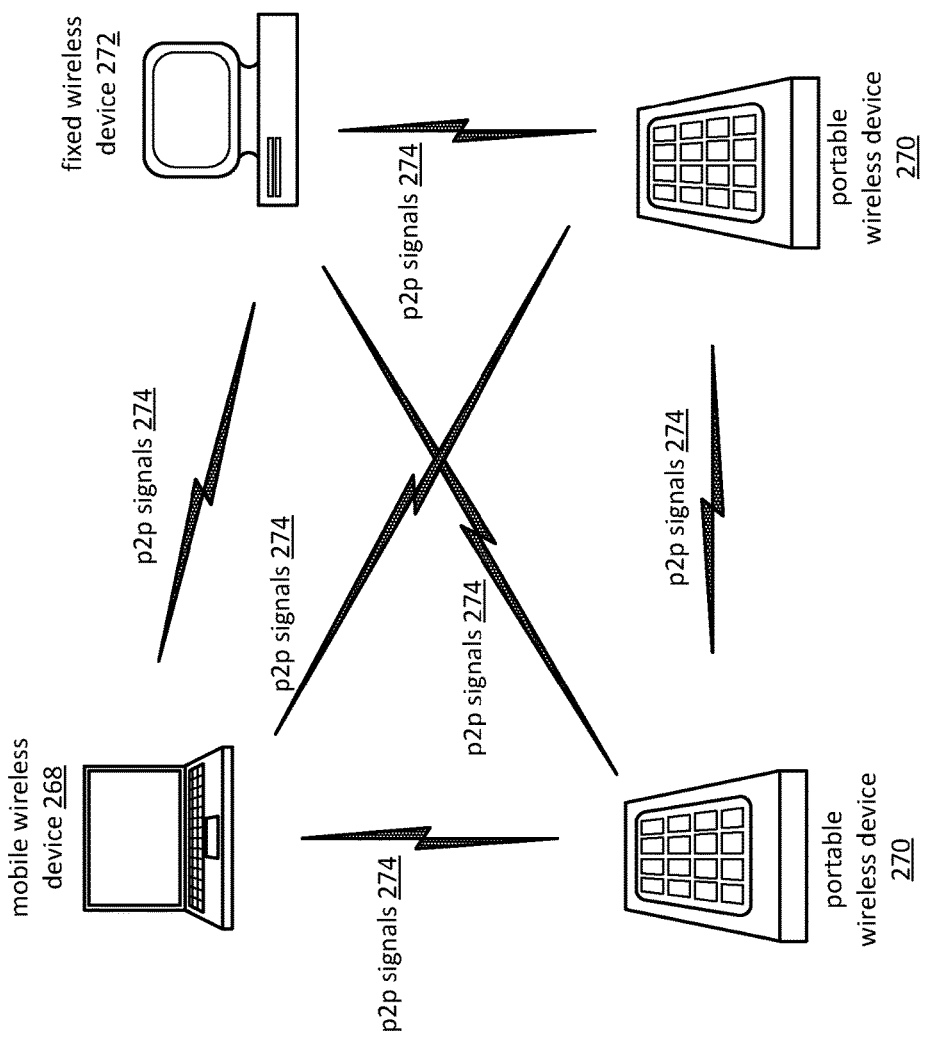
FIG. 18 is a schematic block diagram of another embodiment of a computing system in accordance with the invention.

FIG. 18 is a schematic block diagram of another embodiment of a computing system. As illustrated, the system includes one or more of a mobile wireless device 268, one or more of a portable wireless device 270, and one or more of a fixed wireless device 272. An example, each of the wireless devices 268-272 includes DS processing and memory. Such a wireless device may distributedly store data to other wireless devices utilizing peer-to-peer (p2p) signals 274 as described below.

The wireless devices 268-272 communicate wireless signals including p2p wireless signals 274 with each other (e.g., when within range of each other) and may operate in accordance with one or more wireless industry standards including Bluetooth, universal mobile telecommunications system (UMTS), global system for mobile communications (GSM), long term evolution (LTE), wideband code division multiplexing (WCDMA), IEEE 802.11, IEEE 802.16. The wireless devices 268-272 may move from geographic area to area or traverse through a building resulting in varying levels of availability due to drop outs and poor coverage. In an instance, the portable wireless device 270 may experience degraded or no operation when the internal battery capacity degrades. As such, the wireless device 270 may not be as available (e.g., with p2p connectivity) as compared to a wired computing device. In an example of operation, the portable wireless device 270 distributedly stores and/or retrieves data based on varying levels of wireless connectivity as is discussed in greater detail below.

In an example, the wireless device 268-272 includes a memory to store EC data slices from any of the wireless device 268-272. The size of the memory may be configured to store a predetermined amount of EC data slices. In an example, the memory may be partitioned into at least two portions where a first portion is devoted to storing slices for others and a second portion is devoted to storing data that is not slices for others (e.g., the wireless device associated with the memory). In an example, the partitioning may be changed from time to time based on one or more of a user input, a command, wireless connectivity metrics (e.g., measures of the coverage or battery degradation), and a memory utilization indicator (e.g., historical record of actual use). Note that the wireless device may be commissioned as a network storage device with a minimum amount of memory portioned for the storing of slices of other wireless devices 268-272.

In an example, mobile wireless device 268 establishes connections or affiliations with other wireless devices 270-272 within wireless range of mobile wireless device 268 to enable the utilization of the plurality of wireless devices to store and retrieve EC data slices. In an instance of storing, mobile wireless device 268 determines to store a data object in one or more of locally (e.g., in the wireless device) as a data object file, locally as slices, and in other wireless devices 270-272 as slices. Note that the topology of the p2p connections may change from time to time such that slices stored to another wireless device may not be directly and/or immediately available for subsequent retrieval.

In an example, the mobile wireless device 268 tracks affiliation history to provide trends to a wireless storage device determination method. The mobile wireless device 268 determines wireless device ratings of each of the other wireless devices 270-272 as a candidate slice storage device based on the connection history and measuring p2p signals 274 quality indicators. A set of p2p signals quality indicators may include one or more of average bit rate, peak bit rate, lowest bit rate, estimated sustained bandwidth, connectivity uptime, availability based on location, current location, and estimated future location. In an example, the mobile wireless device 268 continuously measures the signal quality indicators to produce measurements and saves the measurements in a local memory. Note that wireless devices with a history of constant connectivity with each other may provide an improved storage device solution as compared to wireless devices that have a history of infrequent connectivity. The method of rating wireless devices for storage is discussed in greater detail with reference to FIG. 21.

In an example, the fixed wireless device 272 stores and retrieves slices directly over one p2p signal link to mobile wireless device 268. In another example, the fixed wireless device 272 stores and retrieves slices indirectly with mobile wireless device 268 over two or more sequential p2p signal links (e.g., hops) via at least one intermediary wireless device (e.g., portable wireless device 270). In an instance, the intermediary wireless device temporarily caches the slices before sending the slices to the destination wireless device. The timeframe of the caching may be fractions of a second, seconds, minutes, hours, or longer. The source wireless device may choose the indirect and even time delayed path when no better paths and wireless devices are rated higher.

The wireless device determines a participation status that specifies the operational characteristics of the wireless device and may include creating and sending slices to other wireless devices for storage, receiving/processing slices from another wireless device for storage and/or forwarding (e.g., intermediary operation), sending a slice retrieval command to other wireless devices, and/or retrieving slices in response to receiving a slice retrieval command. The participation status determination may be based on one or more of affiliation history, current affiliations, p2p signals quality indicators, a wireless device memory availability indicator, and a wireless device performance indicator. For example, the portable wireless device 270 may determine the participation status to include storing slices from other wireless devices 268 and 272 when the portable wireless device memory 270 availability indicator is favorable and there are a pillar width n number of wireless devices with favorable affiliation histories (e.g., a group of wireless devices are consistently affiliated with each other).

The wireless device may receive slices from a source wireless device with a store slice command. The wireless device determines its participation status, memory status (e.g., verification that enough memory is available to store the slices) and the p2p signals quality indicators. The wireless device determines how much of the slices to store based on one or more of affiliation history, current affiliations, p2p signals quality indicators, a wireless device memory availability indicator, the size of the slices, a loading indicator (e.g., is it too busy), and/or a wireless device performance indicator. For example, the wireless device may determine to store the received slices when the size of the slices is much less than the available memory, the p2p signals quality indicators are favorable, and the wireless device rating of the source wireless device is favorable. The wireless device sends a message to the source wireless device that sent the slices to indicate the status of the slices (e.g., stored, not stored).

The wireless device may receive a slice retrieval command from another wireless device with slice names. The wireless device determines the p2p signals quality indicators and its participation status. The wireless device attempts to retrieve the slices when the p2p signals quality indicators and its participation status are favorable. The wireless device may verify that the slices are as they were stored (e.g., checksum integrity test). The wireless device sends slices to the another wireless device that requested retrieval of the slices when the slice verification is favorable (e.g., as they were originally stored).

In an example of operation, the mobile wireless device 268 determines its participation status and affiliation history when it has a file to store. The mobile wireless device 268 creates EC data slices of the data file and sends the slices to the other wireless devices 270-272 for storage when the wireless device participation status and affiliation history are favorable. The other wireless devices 270-272 store the slices they receive from the mobile wireless device 268 when they have available memory and when their participation status and affiliation history are favorable. The other wireless devices 270-272 send storage confirmations to the mobile wireless device 268 for the slices stored. The mobile wireless device 268 saves the locations (e.g., wireless device IDs) of the stored slices for use during subsequent retrieval. The other wireless devices 270-272 send the slices to the mobile wireless device 268 when receiving a retrieval command from the mobile wireless device 268 and the other wireless devices 270-272 have sufficient capacity to execute the retrieval and their participation status and affiliation history are favorable. The wireless device methods to distribute and store slices are discussed in greater detail with reference to FIGS. 22-23.

Figure 19:
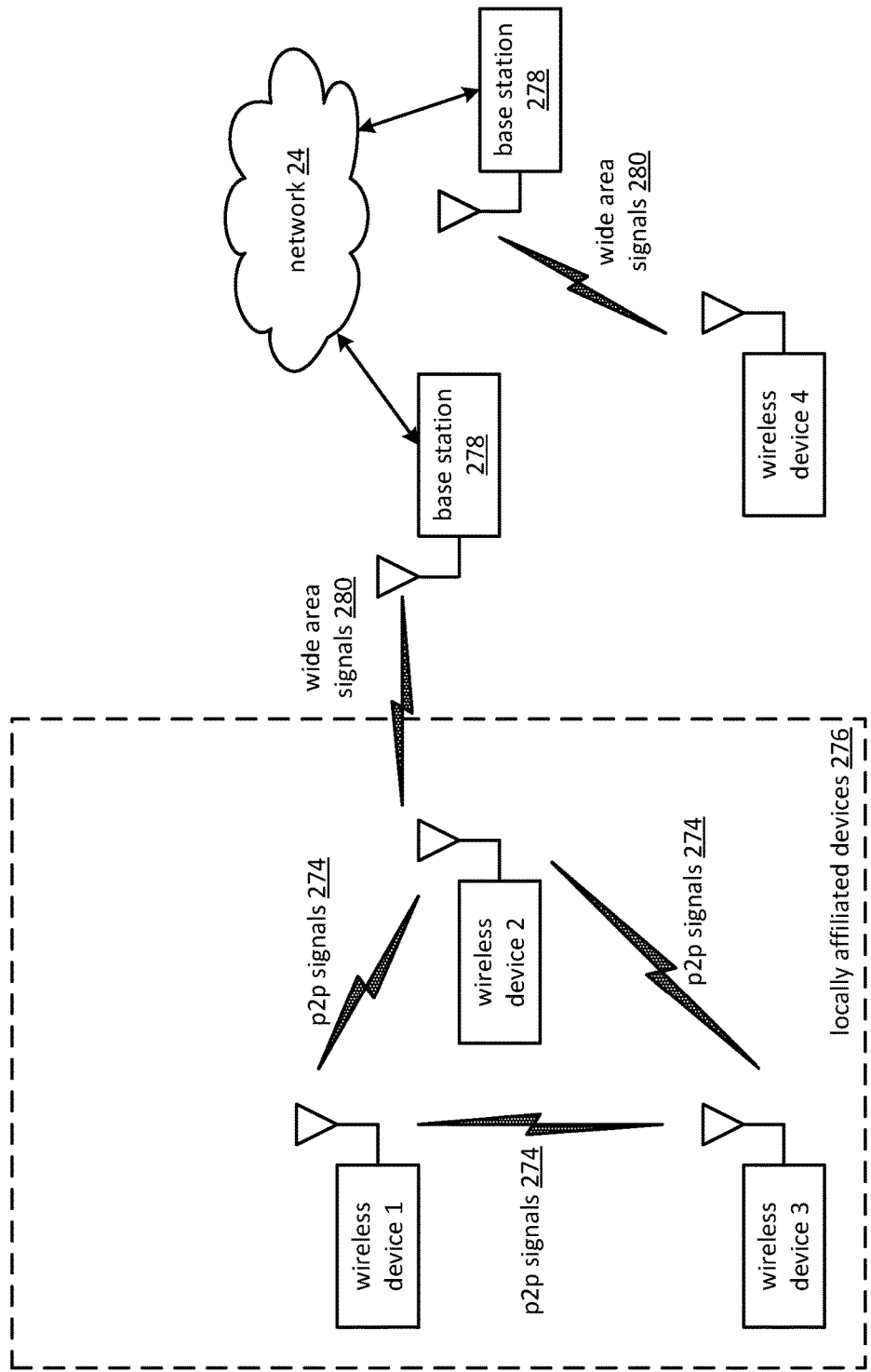
FIG. 19 is a schematic block diagram of another embodiment of a computing system in accordance with the invention.

FIG. 19 is a schematic block diagram of another embodiment of a computing system. As illustrated, system includes locally affiliated devices 276 (e.g., a virtual private network (VPN) group of devices), at least one base station 278, a network 24, and at least one wireless device 4 operably coupled to the at least one base station 278. The locally affiliated devices include a plurality of wireless devices 1-3. In an instance, wireless devices 1-4 include DS processing and memory. The wireless devices 1-4 may be portable, mobile or fixed.

The base stations 278 operably couple to one or more wide area wireless networks that may be part of the network 24. The wireless device 4 is operably coupled to the wide area wireless network via the base station 278. The wireless device 4 and at least one base station 278 communicate wireless signals such as wide area signals 280 with each other (e.g., when within range of each other) and may operate in accordance with one or more wireless industry standards including but not limited to Bluetooth, universal mobile telecommunications system (UMTS), global system for mobile communications (GSM), long term evolution (LTE), wideband code division multiplexing (WCDMA), IEEE 802.11, IEEE 802.16. The wireless devices 1-3 communicate wireless signals including p2p signals 274 with each other (e.g., when within range of each other) and may operate in accordance with one or more wireless industry standards including but not limited to Bluetooth, universal mobile telecommunications system (UMTS), global system for mobile communications (GSM), long term evolution (LTE), wideband code division multiplexing (WCDMA), IEEE 802.11, IEEE 802.16.

In an example of operation, the wireless devices 1-4 communicate directly with each other utilizing p2p signals 274 and/or with wide area signals 280 through one or more wide area wireless networks. In an instance of direct communications, wireless device 1 communicates a message via p2p signals 274 directly with wireless device 3 when they are within wireless range of each other. In an instance of indirect communications, wireless device 2 communicates a message via wide area signals 280 to a first base station 278 which relays the message through the network 24 to a second base station 278 that forwards the message via wide area signals 280 to communicate the message to wireless device 4.

In another operational example, the wireless devices 1-4 may communicate indirectly with each other utilizing one or more combinations of p2p signals 274 and wide area signals 280. In an instance, wireless device 3 communicates a message via p2p signals 274 with wireless device 2 that communicates the message via wide area signals 280 to a first base station 278 which sends the message through the network 24 to a second base station 278 that sends the message via wide area signals 280 to communicate the message to wireless device 4.

Note that wireless devices move from geographic area to area or traverse through a building resulting in varying levels of availability due to drop outs and inadequate wireless coverage. In addition, portable wireless devices may experience degraded or no operation when the internal battery capacity degrades. As such, the wireless device 1-4 may not be as available (e.g., either with p2p connectivity or wide area wireless connectivity) as compared to a wired computing device.

In another operational example, wireless device 1-4 maintains several simultaneous connectivity options as a function of coverage and availability of other wireless devices 1-4 and base stations 278 of the wireless network. For example, wireless device 2 establishes connectivity with wireless devices 1 and 3 utilizing p2p signals 274 and with wireless device 4 utilizing wide area signals 280. Additionally, wireless device 3 establishes connectivity with wireless devices 1 and 2 utilizing p2p signals 274 and with wireless device 4 utilizing both p2p signals 274 (e.g., to wireless device 2 functioning as an intermediary hop) and wide area signals 280. The wireless device maintains an affiliation history of the connectivity options such that a subsequent determination of wireless devices for slice storage can be based in part on the affiliation history as is discussed in greater detail below.

In an implementation example, a wireless device includes memory to store EC data slices from the wireless device and/or other wireless devices. The size of the memory may be configured to store a predetermined amount of EC data slices. In an instance, the memory may be partitioned into at least two portions where a first portion is devoted to storing slices for others and a second portion is devoted to storing data that is not slices for others. Note that the partitioning may be changed from time to time based on one or more of a user input, a command, wireless connectivity metrics (e.g., measures of the coverage or battery degradation), and a memory utilization indicator (e.g., historical record of actual use). Further note that the wireless device may be implemented as a network storage device with a minimum amount of memory portioned for the storing of slices of other wireless devices.

In an example of operation, wireless device 2 establishes connections or affiliations with other wireless devices (e.g., with a combination of one or more of p2p signals 274 and wide area signals 280), to enable the utilization of the plurality of wireless devices to store and retrieve EC data slices.

The wireless device 2 determines to store a data object in one or more of locally (e.g., in the wireless device) as a data object file, locally as slices, and in other wireless devices as slices. Note that the topology of the connections may change from time to time such that slices stored to another wireless device may not be directly and/or immediately available for subsequent retrieval.

In the continuation of the example, wireless device 2 tracks affiliation history to provide trends to a wireless storage device determination method. The wireless device 2 may rate each other wireless device as a candidate slice storage device based on the connection history and the quality of the p2p signals 274 and/or wide area signals 280 to provide a wireless device rating. A signals quality indicator may include one or more of average bit rate, peak bit rate, lowest bit rate, estimated sustained bandwidth, connectivity uptime, availability based on location, current location, and/or estimated future location. Such a determination may be based on measuring metrics and/or a lookup of previously stored metrics. In an instance, the wireless device 2 is continuously measuring the metrics and saving the measurement results in local memory. In another instance, wireless devices with a history of constant connectivity with each other may provide an improved storage device solution as compared to wireless devices that are connected infrequently. The method of rating wireless devices for storage is discussed in greater detail with reference to FIG. 21.

In an example of operation, the wireless device 3 may store and retrieve slices directly over one p2p signal link to another wireless device. In another example, the wireless device 3 may store and retrieve slices indirectly with another wireless device over two or more sequential p2p signal links or combinations of p2p signal links and wide area signal links (e.g., hops) via at least one intermediary wireless device. For example, source wireless device 3 sends slices to intermediary wireless device 2 and intermediary wireless device 2 sends the slices to destination wireless device 1 for storage. Note that the intermediary wireless device 2 may temporarily cache the slices before sending the slices to the destination wireless device 1. The timeframe of the caching may be fractions of a second, seconds, minutes, hours, or longer. The source wireless device 3 may choose the indirect and even time delayed path when no better paths and wireless devices are rated higher.

In another example, wireless device 1 creates and sends two pillars of slices to wireless device 3 via p2p signals 274. Wireless device 3 stores the first pillar of slices and temporarily caches the second pillar of slices. Wireless device 3 moves within p2p signal range of wireless device 4. Wireless device 3 sends the second pillar of slices to wireless device 4 via p2p signals 274 and wireless device 4 stores the second pillar of slices. In another example, wireless device 1 creates and sends two pillars of slices to wireless device 2 via p2p signals 274. Wireless device 2 stores the first pillar of slices and temporarily caches the second pillar of slices. Wireless device 2 forwards the second pillar of slices to wireless device 4 via wide area signals 280 and the network. Wireless device 4 stores the second pillar of slices.

The wireless device 1-4 determines a participation status that specifies the operational characteristics of the wireless device and may include creating and sending slices to other wireless devices for storage, receiving/processing slices from another wireless device for storage and/or forwarding (e.g., intermediary operation), sending a slice retrieval command to other wireless devices, and/or retrieving slices in response to receiving a slice retrieval command. The participation status determination may be based on one or more of affiliation history, current affiliations, signals quality indicators (e.g., for p2p signals and/or wide area signals), a wireless device memory availability indicator, and a wireless device performance indicator. For example, the wireless device may determine the participation status to include storing slices from other wireless devices when the wireless device memory availability indicator is favorable and there are a pillar width n number of wireless devices with favorable affiliation histories (e.g., a group of wireless devices are consistently affiliated with each other).

The wireless device 1-4 may receive slices from a source wireless device with a store slice command. The wireless device determines its participation status, memory status (e.g., verification that enough memory is available to store the slices) and the signals quality indicators. The wireless device determines how much of the slices to store based on one or more of affiliation history, current affiliations, signals quality indicators, a wireless device memory availability indicator, the size of the slices, a loading indicator (e.g., is it too busy), and/or a wireless device performance indicator. The wireless device may store slices based on the determination. For example, the wireless device may determine to store the received slices when the size of the slices is much less than the available memory, the signals quality indicators are favorable, and the wireless device rating of the source wireless device is favorable. The wireless device sends a message to the source wireless device that sent the slices to indicate the status of the slices (e.g., stored, not stored).

The wireless device may receive a slice retrieval command from another wireless device with slice names. The wireless device determines the signals quality indicators and its participation status. The wireless device attempts to retrieve the slices when the signals quality indicators and its participation status are favorable. The wireless device may verify that the slices are as they were stored (e.g., checksum integrity test). The wireless device sends slices to the another wireless device that requested retrieval of the slices when the slice verification is favorable (e.g., as they were originally stored).

In an example of operation, the wireless device 1 determines its participation status and affiliation history when it has a file to store. The wireless device 1 creates EC data slices of the data file and sends the slices to wireless devices 2-4 (e.g., based on affiliation history) for storage when the wireless device participation status and affiliation history are favorable. The wireless devices 2-4 store the slices they receive from the wireless device 1 when they have available memory and when their participation status and affiliation history are favorable. The wireless devices 2-4 send storage confirmations to the wireless device 1 for the slices stored. The wireless device 1 saves the locations (e.g., wireless device IDs) of the stored slices for use during subsequent retrieval. The wireless devices 2-4 send the slices to the wireless device 1 when receiving a retrieval command from the wireless device 1 and the wireless devices 2-4 have sufficient capacity to execute the retrieval and their participation status and affiliation history are favorable. The wireless devices 1-4 methods to distribute and store slices are discussed in greater detail with reference to FIGS. 22-23.

The wireless devices 1-3 may establish a virtual private network (VPN) group of devices (e.g., with peer-to-peer signals 274) in order to create, store, and/or retrieve group specific data. The consensus threshold number of devices (e.g., 3 of 4, 5 of 8, 10 of 16, etc.) may only create, store, or retrieve the group specific data when at least a consensus threshold number of devices are active in the VPN. For example, the group specific data may contain sensitive or private information (e.g., top secret information) that may only be accessed when the at least consensus threshold of devices are physically together and active in the VPN (e.g., for security or privacy reasons).

The at least a consensus threshold number of devices are determined to be active in the VPN by verifying user identifiers (IDs) affiliated with the VPN group of devices and verifying a unique user code related to group specific data. In an alternative, the at least the consensus threshold number of devices are determined to be active in the VPN by verifying a proximity of the consensus threshold number of devices in accordance with a group gathering threshold (e.g., within the same room, within the same building, within 50 feet of each other, etc.) and verifying a peer-to-peer communication between the consensus threshold number of devices.

When the at least a consensus threshold number of devices are active in the VPN, the one or more of the consensus threshold number of devices may create the group specific data. Error coding parameters are established based on the consensus threshold number of devices in the VPN group of devices (which provides the decode threshold number of the error coding parameters) and the number of devices in the VPN group of devices (which provides the pillar width number of the error coding parameters) for accessing the group specific data. The group specific data is encoded based on the consensus threshold of devices and a number of devices in the VPN group of devices to produce one or more sets of encoded data slices.

The one or more sets of encoded data slices are then sent to the consensus number of devices in the VPN or to the DSN for storage therein. The group specific data is also encrypted using an encryption key. The encryption key is encoded based on the consensus threshold number and the number of devices in the VPN group of devices to produce one or more sets of encoded key slices. The one or more sets of encoded key slices are sent to the consensus number of devices in the VPN or to the DSN for storage therein. When the one or more sets of encoded data slices are sent to the DSN memory for storage, the one or more sets of encoded key slices are sent to the consensus threshold number of devices. When the one or more sets of encoded data slices are sent to the consensus threshold number of devices, the one or more sets of encoded key slices are sent to the DSN memory for storage.

Data directory information regarding storage of the group specific data may also be generated. The data directory information is encoded based on the consensus threshold number and the number of devices in the VPN group of devices to produce one or more sets of encoded directory slices. The one or more sets of encoded directory slices are then sent to the consensus threshold number of devices or the DSN memory for storage therein. When the one or more sets of encoded data slices are sent to the DSN memory for storage, the one or more sets of encoded directory slices are sent to the consensus threshold number of devices. When the one or more sets of encoded data slices are sent to the consensus threshold number of devices, the one or more sets of encoded directory slices are sent to the DSN memory for storage.

When the at least the consensus threshold number of devices are not active in the group of devices, the devices in the VPN are prohibited from creating the group specific data or accessing previously created group specific data.

Figure 20:
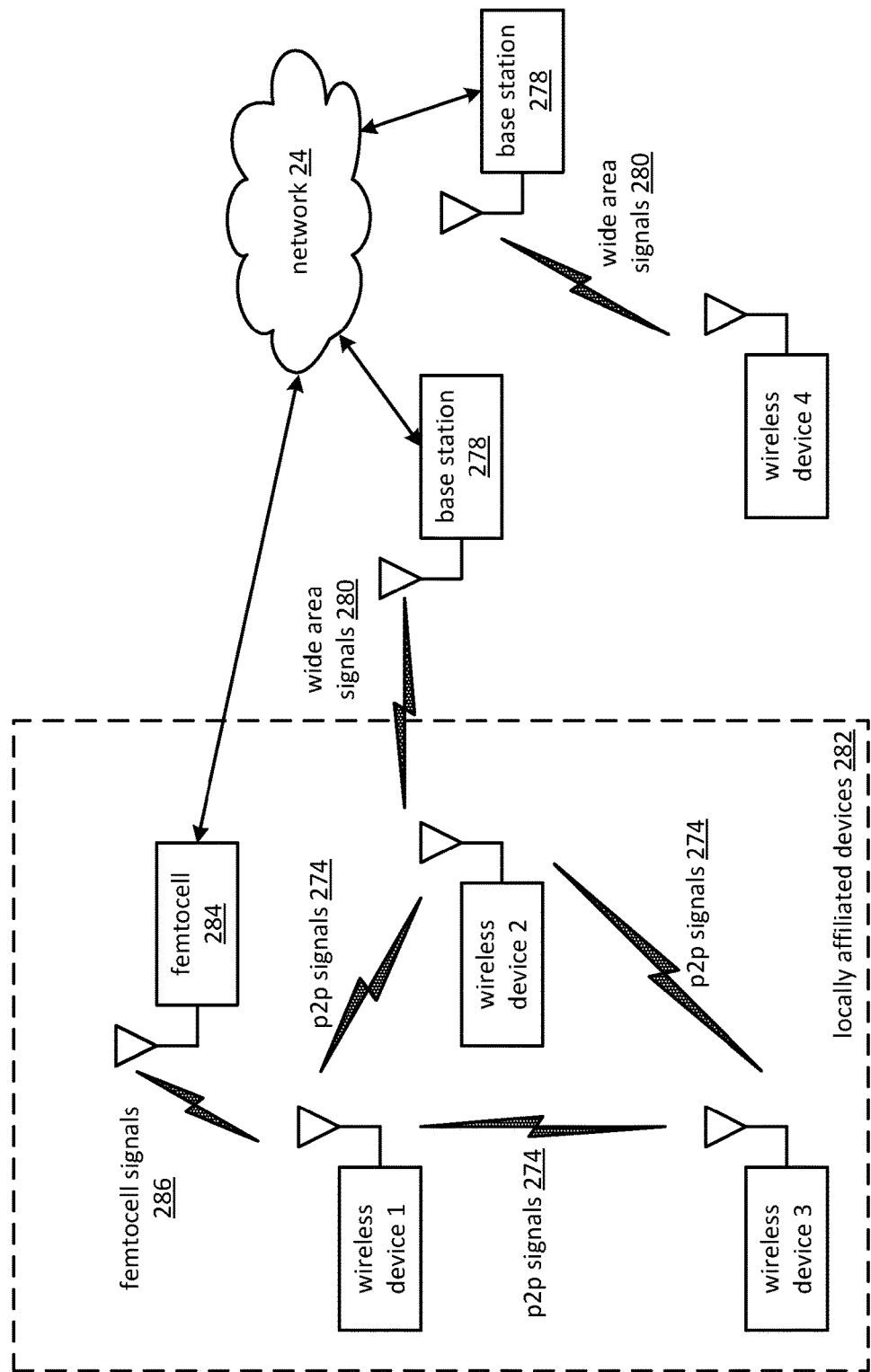
FIG. 20 is a schematic block diagram of another embodiment of a computing system in accordance with the invention.

FIG. 20 is a schematic block diagram of another embodiment of a computing system. As illustrated, the system includes locally affiliated devices 282, at least one base station 278, a network 24, and at least one wireless device 4 operably coupled to the at least one base station 278. The locally affiliated devices 282 include a plurality of wireless devices 1-3 and at least one femtocell 284. In an instance of implementation, wireless devices 1-4 include DS processing and memory and may be portable, mobile or fixed.

The base stations 278 and femtocell 284 operably couple to one or more wide area wireless networks that may be part of the network 24. The wireless devices 1-4 may operably couple to the wide area wireless network via the base stations 278 and/or the femtocell 284. For example, the wireless device 4 is operably coupled to the wide area wireless network via the base stations 278 and the wireless device 1 is operably coupled to the wide area wireless network via the femtocell 284. The wireless device 4 and at least one base station 278 communicate wireless signals including wide area signals 280 and/or femtocell signals 286 with each other (e.g., when within range of each other) and may operate in accordance with one or more wireless industry standards including but not limited to Bluetooth, universal mobile telecommunications system (UMTS), global system for mobile communications (GSM), long term evolution (LTE), wideband code division multiplexing (WCDMA), IEEE 802.11, IEEE 802.16.

The wireless devices 1-3 that comprise the locally affiliated devices 282 communicate wireless signals including p2p signals 274 with each other (e.g., when within range of each other) and may operate in accordance with one or more wireless industry standards including but not limited to Bluetooth, universal mobile telecommunications system (UMTS), global system for mobile communications (GSM), long term evolution (LTE), wideband code division multiplexing (WCDMA), IEEE 802.11, IEEE 802.16. In an example, the wireless devices 1-4 may communicate directly with each other utilizing p2p signals 274 and/or may communicate indirectly with each other utilizing wide area signals 280 and/or femtocell signals 286 through one or more wide area wireless networks. In an example of direct communications, wireless device 1 communicates a message via p2p signals 274 directly with wireless device 3 when they are within wireless range of each other. In an example of indirect communications, wireless device 1 communicates a message via femtocell signals 286 to the femtocell which forwards the message through the network to the base station 278 that forwards the message via wide area signals 280 to communicate the message to wireless device 4.

In another operational example, the wireless devices 1-4 communicate indirectly with each other utilizing one or more combinations of p2p signals 274, femtocell signals 286, and wide area signals 280. In an instance, wireless device 3 communicates a message via p2p signals 274 with wireless device 1 that communicates the message via femtocell signals 286 to a femtocell 284 which forwards the message through the network to the base station 278 that forwards the message via wide area signals 280 to communicate the message to wireless device 4.

Note that the wireless devices 1-4 may move from geographic area to area or traverse through a building resulting in varying levels of availability due to drop outs and poor coverage. The wireless device may prioritize utilizing the femtocell 284 to communicate with the network over utilizing the wide area base station 278 when the femtocell 284 is deployed within the vicinity of the locally affiliated devices 282 (e.g., in a building or underground facility). Portable wireless devices may experience degraded or no operation when the internal battery capacity degrades. As such, the portable wireless device may not be as available (e.g., either with p2p connectivity, femtocell signal connectivity, or wide area wireless connectivity) as compared to a wired computing device.

The wireless device 1-4 maintains several simultaneous connectivity options as a function of coverage and availability of other wireless devices 1-4, femtocells 284, and base stations 278 of the wireless network. For example, wireless device 2 establishes connectivity with wireless devices 1 and 3 utilizing p2p signals 274 and with wireless device 4 utilizing wide area signals 280. In addition, wireless device 3 establishes connectivity with wireless devices 1 and 2 utilizing p2p signals 274 and with wireless device 4 utilizing both p2p signals 274 (e.g., to wireless device 1 functioning as an intermediary hop), femtocell signals 286 from wireless device 1 to the network, and wide area signals 280 from the network to wireless device 4. The wireless device maintains an affiliation history of the connectivity options such that a subsequent determination of wireless devices for slice storage can be based in part on the affiliation history as is discussed in greater detail below.

In an implementation example, the wireless device 1-4 includes memory to store EC data slices from the wireless device and/or other wireless devices. The size of the memory may be configured to store a predetermined amount of EC data slices. In an instance, the memory may be partitioned into at least two portions where a first portion is devoted to storing slices for others and a second portion is devoted to storing data that is not slices for others. Note that the partitioning may be changed from time to time based on one or more of a user input, a command, wireless connectivity metrics (e.g., measures of the coverage or battery degradation), and/or a memory utilization indicator (e.g., historical record of actual use). Further note that the wireless device may be implemented as a network storage device with a minimum amount of memory portioned for the storing of slices of other wireless devices.

In an operational example, the wireless device 1-4 establishes connections or affiliations with other wireless devices (e.g., with a combination of one or more of p2p signals 274, femtocell signals 286, and wide area signals 280), to enable the utilization of the plurality of wireless devices to store and retrieve EC data slices. The wireless device determines to store a data object in one or more of locally (e.g., in the wireless device) as a data object file, locally as slices, and in other wireless devices as slices. Note that the topology of the connections may change from time to time such that slices stored to another wireless device may not be directly and/or immediately available for subsequent retrieval.

In an operational example, the wireless device 1-4 tracks affiliation history to provide trends to a wireless storage device determination method. The wireless device may rate each other wireless device as a candidate slice storage device based on the connection history and the quality of the p2p signals 274, femtocell signals 286, and/or wide area signals 280 to provide a wireless device rating. A signals quality indicator may include one or more of average bit rate, peak bit rate, lowest bit rate, estimated sustained bandwidth, connectivity uptime, availability based on location, current location, and/or estimated future location. Such a determination may be based on measuring metrics and/or a lookup of previously stored metrics. In an instance, the wireless device continuously measures the metrics and saving the measurement results in local memory. In an instance, wireless devices with a history of constant connectivity with each other may provide an improved storage device solution as compared to wireless devices that are connected infrequently. The method of rating wireless devices for storage is discussed in greater detail with reference to FIG. 21.

In an operational example, the wireless device stores and retrieves slices directly over one p2p signal link to another wireless device. In another example, the wireless device stores and retrieves slices indirectly with another wireless device over two or more sequential p2p signal links or combinations of p2p signal links, femtocell signal links, and/or wide area signal links (e.g., hops) via at least one intermediary wireless device. In an instance, source wireless device 3 sends slices to intermediary wireless device 1 and intermediary wireless device 1 forwards the slices to destination wireless device 2 for storage. Note that the intermediary wireless device 1 may temporarily cache the slices before forwarding the slices to the destination wireless device 2. The timeframe of the caching may be fractions of a second, seconds, minutes, hours, or longer. In an instance, source wireless device 3 chooses the indirect and even time delayed path when no better paths and wireless devices are rated higher.

In another example, wireless device 1 creates and sends two pillars of slices to wireless device 3 via p2p signals 274. Wireless device 3 stores the first pillar of slices and temporarily caches the second pillar of slices. Wireless device 3 moves within p2p signal range of wireless device 4. Wireless device 3 forwards the second pillar of slices to wireless device 4 via p2p signals 274 and wireless device 4 stores the second pillar of slices. In another example, wireless device 3 creates and sends two pillars of slices to wireless device 1 via p2p signals 274. Wireless device 1 stores the first pillar of slices and temporarily caches the second pillar of slices. Wireless device 1 forwards the second pillar of slices to wireless device 4 via femtocell signals 286 to the network and then via wide area signals 280 to wireless device 4. Wireless device 4 stores the second pillar of slices.

In an example of operation, the wireless device determines a participation status that specifies the operational characteristics of the wireless device and may include creating and sending slices to other wireless devices for storage, receiving/processing slices from another wireless device for storage and/or forwarding (e.g., intermediary operation), sending a slice retrieval command to other wireless devices, and/or retrieving slices in response to receiving a slice retrieval command. The participation status determination may be based on one or more of affiliation history, current affiliations, signals quality indicators (e.g., for p2p signals, femtocell signals, and/or wide area signals), a wireless device memory availability indicator, and a wireless device performance indicator. For example, the wireless device determines the participation status to include storing slices from other wireless devices when the wireless device memory availability indicator is favorable and there are a pillar width n number of wireless devices with favorable affiliation histories (e.g., a group of wireless devices are consistently affiliated with each other).

In an operational example, the wireless device receives slices from a source wireless device with an associated store slice command. The wireless device determines its participation status, memory status (e.g., verification that enough memory is available to store the slices) and the signals quality indicators. Next, the wireless device determines how much of the slices to store based on one or more of affiliation history, current affiliations, signals quality indicators, a wireless device memory availability indicator, the size of the slices, a loading indicator (e.g., is it too busy), and a wireless device performance indicator. In an instance, the wireless device stores slices based on the determination. In such an instance, the wireless device determines to store the received slices when the size of the slices is much less than the available memory, the signals quality indicators are favorable, and the wireless device rating of the source wireless device is favorable. Next, the wireless device sends a message to the source wireless device that sent the slices to indicate the status of the slices (e.g., stored, not stored).

An example of operation, the wireless device receives a slice retrieval command from another wireless device with slice names. Next, the wireless device determines the signals quality indicators and its participation status. The wireless device attempts to retrieve the slices when the signals quality indicators and its participation status are favorable. Next, the wireless device verifies that the slices are as they were stored (e.g., checksum integrity test). The wireless device sends slices to the another wireless device that requested retrieval of the slices when the slice verification is favorable (e.g., as they were originally stored).

In another example of operation, the wireless device 1 determines its participation status and affiliation history when it has a file to store. The wireless device 1 creates EC data slices of the data file and sends the slices to wireless devices 2-4 (e.g., based on affiliation history) for storage when the wireless device participation status and affiliation history are favorable. The wireless devices 2-4 store the slices they receive from the wireless device 1 when they have available memory and when their participation status and affiliation history are favorable. The wireless devices 2-4 send storage confirmations to the wireless device 1 for the slices stored. The wireless device 1 saves the locations (e.g., wireless device IDs) of the stored slices for use during subsequent retrieval. The wireless devices 2-4 send the slices to the wireless device 1 when receiving a retrieval command from the wireless device 1 and the wireless devices 2-4 have sufficient capacity to execute the retrieval and their participation status and affiliation history are favorable. The wireless device methods to distribute and store slices are discussed in greater detail with reference to FIGS. 22-23.

FIG. 21 is an example table representing a wireless device rating table 288. As illustrated, the table includes a device ID 290 field, a path 292 field, path rating 294 field, a history 296 field, and a device rating 298 field. As illustrated, records are organized by the device ID 290 field for each other wireless device that may connect with the wireless device via one or more of the possible wireless connectivity paths. As such, the wireless device rating table 288 is utilized by a wireless device to rate the wireless connectivity to all other possible wireless devices.

In an example of operation, the wireless device builds the wireless device rating table 288 through a series of steps described herein. The method begins with the step where a processing module of the wireless device determines the device ID 290 of the other wireless devices (e.g., the device ID is the identifier of the other wireless device being measured and rated) and fills out the device ID 290 field with the device ID. Such a determination may be based on one or more of a predetermination (e.g., preprogrammed), querying the other wireless device subsequent to establishing a connection, and/or receiving a list from another wireless device.

Next, the processing module determines the path 292 to the other wireless devices where the path is a potential primary wireless signaling connection from the wireless device to the other wireless device being measured and rated. Such a determination may be based on one or more of a predetermination (e.g., preprogrammed), establishing connections to other wireless devices, and receiving a list from another wireless device. For example, p2p refers to the direct and/or indirect path utilizing only p2p signaling, femto refers to the indirect path utilizing femtocell signaling, and wide area refers to the path utilizing wide area signaling. Note that each path alternative may comprise numerous permutations of connectivity utilizing combinations of the connectivity elements (e.g., multiple hops). In another example, the path entry refers to the path route with the fewest hops. In another example, the path entry refers to the path route with the lowest latency. In yet another example, a unique path entry is listed for every possible path permutation such that every path is listed, not just the favored path. The processing module fills out the path 292 field with path information.

The method continues where the processing module determines the path rating 294 to the other wireless devices where the path rating 294 rates each of the paths against each other utilizing substantially similar comparison metrics. Such a determination may be based on one or more of a predetermination (e.g., preprogrammed such that p2p is always the most favored path), comparing measured aggregate signals quality indicators for the total path, a command, and receiving a list from another wireless device. Note that a lower rating number indicates a more preferable path. In a first example, the p2p path is rated a 1 since a predetermination indicates that all p2p primary paths are to be rated 1. In a second example, the femto path is rated a 2 and the wide area path is rated a 3 since a predetermination indicates that all femto paths are to be rated above all wide area paths. In a third example, the femto path is rated a 3 and the wide area path is rated a 2 since a query of signals quality indicators reveals that the wide area path has superior performance over the femto path. The processing module fills out the path rating 294 field with path rating information.

In an example of operation, the processing module determines how to communicate with the other wireless device based on one or more of the path info, a performance requirement, a security requirement, and a reliability requirement. The wireless device may utilize one or more simultaneous paths to communicate with the other wireless device. For example, wireless device 3 may determine to utilize one path to communicate with wireless device 1 with p2p signals directly from wireless device 3 to wireless device 1 when low latency performance is required. In another example, wireless device 3 may determine to utilize two paths to communicate with wireless device 1 utilizing p2p signals directly from wireless device 3 to wireless device 1 and p2p signals from wireless device 3 to wireless device 2 and p2p signals from wireless device 2 to wireless device 1 when high bandwidth performance is required.

The method continues where the processing module determines the history 296 of affiliation to the other wireless devices where the history indicates what percentage of the time the wireless device has been affiliated with the other wireless device. Such a determination may be based on measuring and recording the time durations of affiliation with the other wireless device. Note that each history field 296 entry is in the 0% to 100% range. In an example, the affiliation history between the wireless device and wireless device 2 is 90% of the time the two have been connected with p2p signals, 5% of the time the two have been connected with femtocell signals, and 8% of the time the two have been connected with wide area signals. Note that each number is substantially independent (e.g., the sum is over 100%). In an instance, the p2p path is a preferred path. In another example, the affiliation history between the wireless device and wireless device 4 is 25% of the time the two have been connected with p2p signals, 0% of the time the two have been connected with femtocell signals, and 85% of the time the two have been connected with wide area signals. In this example, the wide area path is a preferred path, but wireless device 4 may not be the most preferred device to store slices. Note that the history field may be a rolling infinite time average or a limited term average (e.g., the last 100 days, the last 10 days, the last day, the last hour, the last minute, etc.). The processing module fills out the history 296 field with history information.

The method continues where the processing module determines the device rating 298 of the other wireless devices where the device rating rates each of the other wireless devices against each other based on substantially similar metrics. Such a determination may be based on one or more of the wireless device ID, the path 292, the path rating 294, the history 296, and a rating algorithm. Note that a lower rating number is more preferable. For example, the processing module rates devices 1 and 2 via the p2p signaling paths as a 1 since both devices are highly available over the best rated paths (e.g., the p2p path). In the example, the processing module rates device 2 via the wide area signaling path as a 2 since it is highly available overall between the p2p path and the wide area path. In example, the processing module rates device 3 via the p2p signaling path as a 2 since it is generally available (e.g., 75%) via the highly rated (e.g., 1) p2p path. In the example, the processing module rates device 6 via the wide area signaling path as a 4 since it is generally not available (e.g., 5%) via the lowest rated (e.g., 3) wide area path.

With the wireless device rating table 288 substantially completed, the processing module of the wireless device utilizes the device rating 298 to determine which of the possible wireless devices to utilize to store and retrieve slices. In an example, the processing module may start with the wireless devices with the best device ratings and works down as it chooses more devices for storage when the best priority and performance is required. In an instance, the processing module may determine to utilize wireless devices 1-3 since they have the best ratings when the operational parameters include a pillar with n=3. In another example, the processing module may start with the wireless devices with the poorest device ratings and works up as it chooses more devices for storage when the best priority and performance is not required. In an instance, the processing module may determine to utilize wireless device 4-6 since they have the poorest ratings when the operational parameters include a pillar with n=3.

Figure 22:
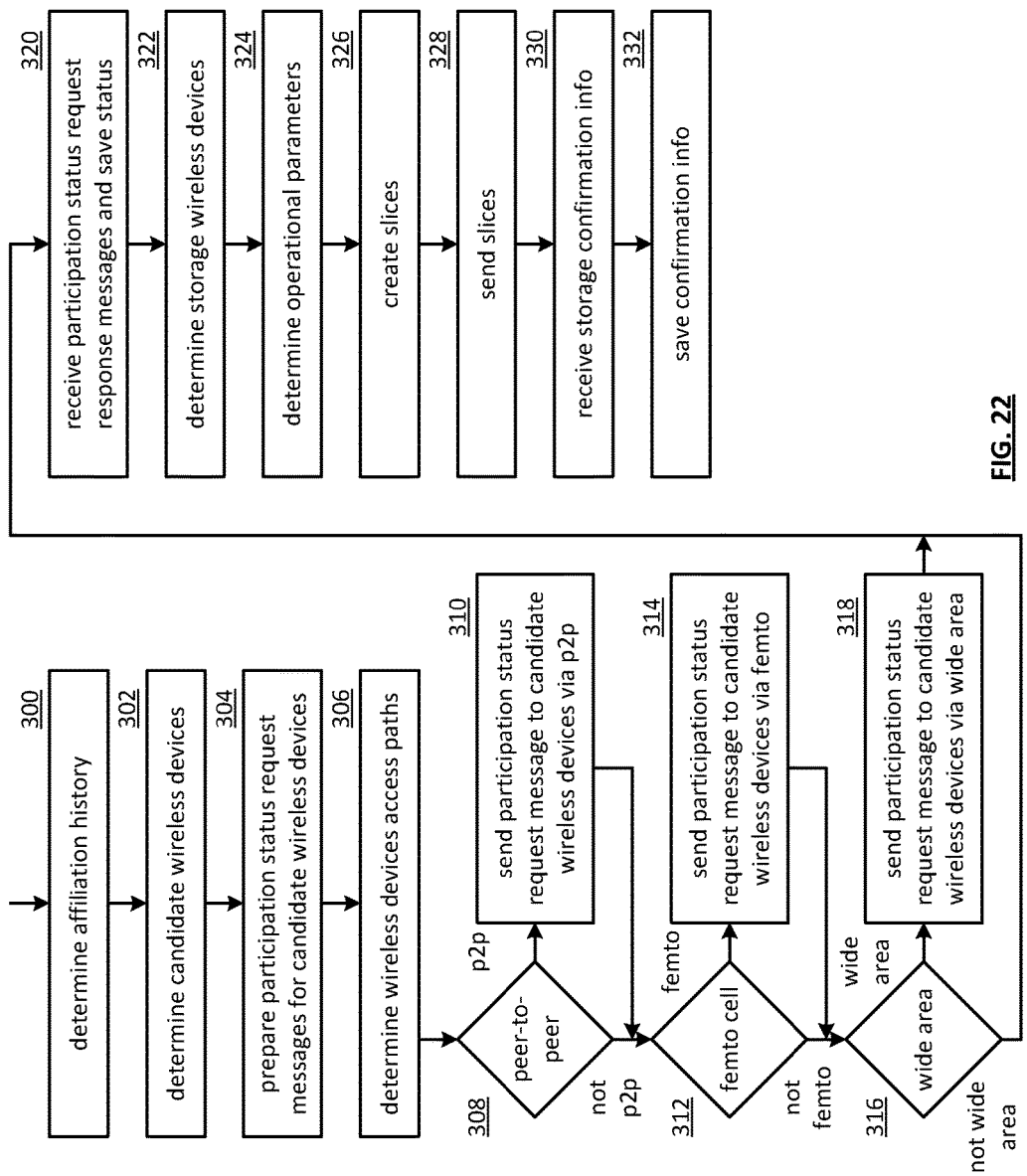
FIG. 22 is a flowchart illustrating another example of distributing slices in accordance with the invention.

FIG. 22 is a flowchart illustrating another example of distributing slices. The method begins with step 300 where a wireless device determines an affiliation history when the wireless device has a data object and/or data file to store. Such a determination may be based on an instantaneous lookup into a wireless device rating table or by a lookup into wireless device rating table subsequent to a table refresh. At step 302, the wireless device determines candidate wireless devices based on one or more of the wireless device rating table, a performance requirement, a security requirement, a reliability requirement, estimated wireless device performance, estimated wireless device security, and estimated wireless device reliability. In an example, the wireless device determines the candidate wireless devices to be the devices with the best wireless device ratings based on the wireless device rating table when the wireless devices have similar estimated performance, estimated security, and estimated reliability.

The method continues at step 304 where the wireless device prepares a participation status request message for the candidate wireless devices where the message may include one or more of a wireless device ID, a participation status command, a size of the slices that are desired to be stored in the candidate wireless device, a performance indicator, a security indicator, and a reliability indicator. At step 306, the wireless device determines the candidate wireless device access paths based in part on the path field of the wireless device rating table. Note that the wireless device may determine more than one path to the candidate wireless device such that the participation status request may be sent via the more than one path. Note that the wireless device may determine the path with the best path rating as discussed previously with reference to FIG. 21.

At step 308, the wireless device determines if the access path is peer to peer. The method branches to step 310 when the wireless device determines the access path to be peer-to-peer. The method continues to step 312 when the wireless device determines the path not to be peer-to-peer. At step 310, the wireless device sends the participation status request message to the candidate wireless device via the p2p path.

At step 312, wireless device determines if the access path is femto cell. The method branches to step 314 when the wireless device determines the access path to be femto cell. The method continues to step 316 when the wireless device determines the path not to be femto cell. At step 314, the wireless device sends the participation status request message to the candidate wireless device via the femto cell path.

At step 316, the wireless device determines if the access path is wide area. The method branches to step 318 when the wireless device determines access path to be wide area. The method branches to step 320 when the wireless device determines the access path not to be wide area. At step 318, the wireless device sends the participation status request message to the candidate wireless device via the wide area path.

Note that the candidate wireless device receives the participation status request message from the wireless device. The candidate wireless device determines the participation status that specifies the operational characteristics of the wireless device which may include one or more of creating and sending slices to other wireless devices for storage, receiving/processing slices from another wireless device for storage and/or forwarding (e.g., intermediary operation), sending a slice retrieval command to other wireless devices, and retrieving slices in response to receiving a slice retrieval command. The candidate wireless device creates a participation status request response message which includes one or more of security information, performance information, and reliability information. The participation status determination may be based on one or more of affiliation history, current affiliations, signals quality indicators, a wireless device memory availability indicator, and a wireless device performance indicator. The candidate wireless device sends the participation status request response message to the wireless device that includes the participation status.

At step 320 the wireless device receives the participation status request response message from the candidate wireless devices and saves the participation status. At step 322, the wireless device determines the storage wireless devices for the slice pillars based on one or more of the wireless device rating table, a performance requirement, a security requirement, a reliability requirement, estimated wireless device performance, estimated wireless device security, estimated wireless device reliability, the security information, the performance information, and the reliability information. In an example, the wireless device determines the storage wireless devices to be the devices with the best wireless device ratings based on the wireless device rating table when the wireless devices have similar estimated performance, estimated security, estimated reliability, security information, performance information, and reliability information.

At step 324, the wireless device determines operational parameters for the slice creation and distribution based on one or more of the number of determined storage devices, data type, data size, a priority indicator, a security indicator, a reliability indicator, the participation status request response messages, the device history, the device paths, and the device rating. For example, the wireless device determines a 16/10 pattern (e.g., n=16 with a read threshold k=10) when at least 16 storage wireless devices were determined and the requirements (e.g., security, performance, and reliability) are substantially met by the storage wireless devices and associated paths.

At step 326, the wireless device creates the EC data slices in accordance with the operational parameters utilizing an error coding dispersal storage function. At step 328, the wireless device sends the slices to the storage wireless devices via the access paths. In an example, the wireless device sends a read threshold number of slices per data segment for storage to the best rated devices and then the rest of the slices to the other storage wireless devices. The storage wireless devices process the slices and send the wireless device a confirmation method in accordance with the processing. The confirmation message which includes one or more of a storage wireless device ID, slice names stored, slice names not stored, and slice names cached pending slices to be sent to at least one other wireless device. At step 330, the wireless device receives the confirmation message information. At step 332, the wireless device saves the confirmation information such that it may be utilized in a subsequent slice retrieval.

Figure 23:
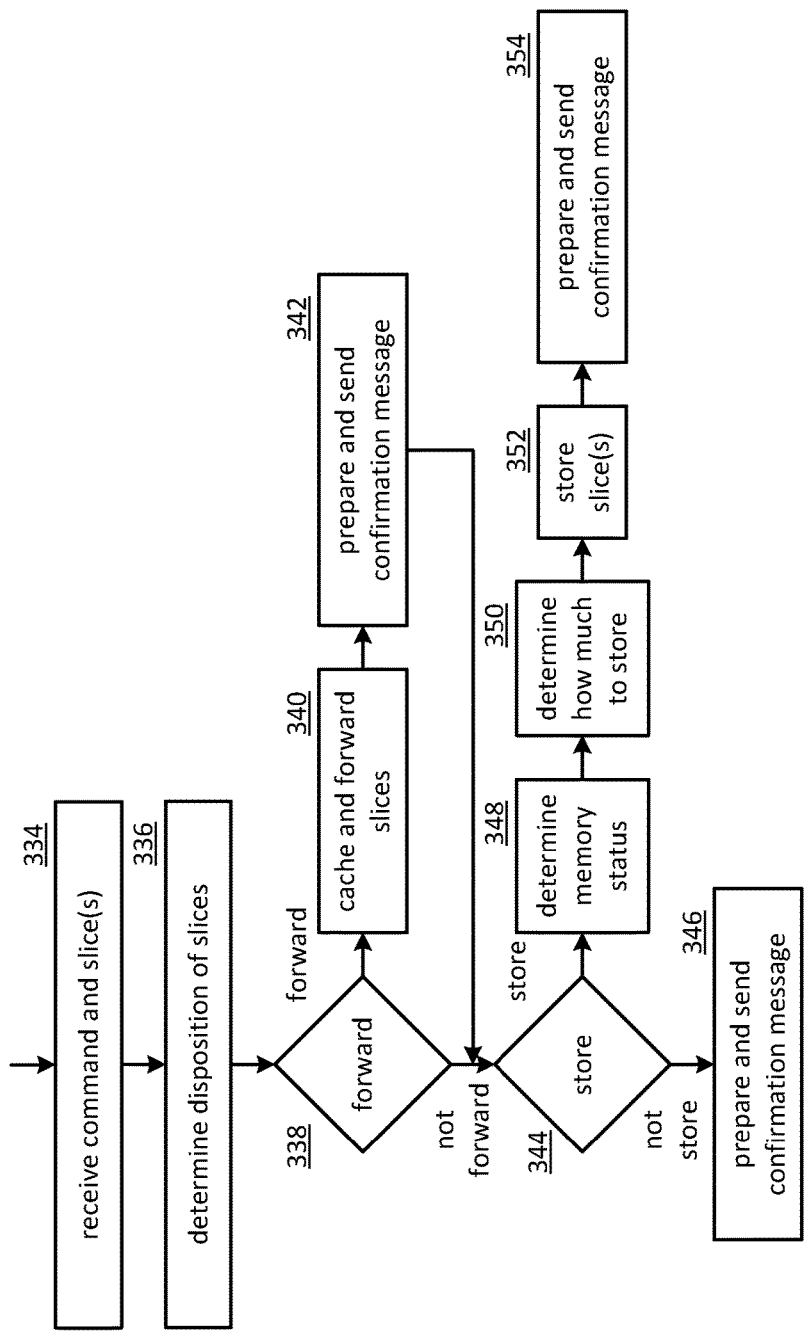
FIG. 23 is a flowchart illustrating another example of storing slices in accordance with the invention.

FIG. 23 is a flowchart illustrating another example of storing slices. The method begins with step 334 where a wireless device receives a command and slice(s) from the DS processing of another wireless device. The command includes one or more of store slices, forward slices, or store and/or forward slices. At step 336, the wireless device determines a disposition of the slices to include one of store a portion and don't forward, forward a portion and don't store, store a portion and forward a portion, or don't store and don't forward any slices. Such a determination may be based on one or more of the received command, a participation status of the wireless device, other device history, the other device ratings, a wireless device loading indicator, a slice size indicator, a command, and a memory availability indicator. For example, the wireless device may determine to store one pillar and forward a second pillar of two received pillars of slices when the received command is store and/or forward slices and the slice sizes compared to the memory availability indicator is favorable.

At step 338, the wireless device determines if the disposition is to forward slices. The method branches to step 344 when the wireless device determines that the disposition is not to forward slices. The method continues to step 340 when the wireless device determines that the disposition is to forward slices. At step 340, the wireless device caches the slices to be forwarded. Next, the wireless device forwards the cached slices to another wireless device with a store command when the connectivity is favorable. Note that the wireless device determines the path based in part on the path field from the wireless device rating table. At step 342, the wireless device prepares and sends a confirmation message to the device that the slices were received from. The confirmation message indicates the slice names of the slices that were forwarded and the wireless device ID where the slices were sent.

At step 344, the wireless device determines if the disposition of slices is to store slices. The method branches to step 346 when the wireless device determines the disposition to be not to store the slices. The method continues to step 348 when the wireless device determines the disposition of slices to be store the slices. At step 348, the wireless device determines a memory availability status. At step 350, the wireless device determines how much of a portion of the slices to store based in part on the memory availability status and slice sizes. At step 352, the wireless device stores the portion of slices based on the determination of how much to store. At step 354 the wireless device prepares and sends a confirmation message to the device that the slices were received from. The confirmation message indicates the slice names of the slices that were stored, the slice names of the slices that were not stored, and the wireless device ID.

At step 346, the wireless device prepares and sends a confirmation message when the wireless device determines the disposition to be not to store any slices. The confirmation message indicates the slice names of the slices that were not stored and the wireless device ID. Note that a method to subsequently retrieve slices may utilize the method discussed with reference to FIG. 17. The retrieving wireless device may choose to send slices back to the requester via the paths determined in the path field of the wireless device rating table.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:
1. A method comprises:
  determining whether a consensus threshold number of devices are active in a virtual private network (VPN) group of devices by:
  verifying user identifiers (IDs) affiliated with the VPN group of devices;
  verifying a unique user code related to group specific data; and
  verifying a peer-to-peer communication between the consensus threshold number of devices;

when determining at least a consensus threshold number of devices are active in the VPN group of devices:
encoding, by a device of the at least the consensus threshold number of devices, a data segment of group specific data based on a consensus threshold number of devices in the VPN group of devices and a number of devices in the VPN group of devices to produce a set of encoded data slices;
wherein the consensus threshold number corresponds to a decode threshold number of encoded data slices of the set of encoded data slices required to reconstruct the data segment, and the number of devices in the VPN group corresponds to a total number of encoded data slices in the set of encoded data slices;
sending, by the device, a unique encoded data slice of the decode threshold number of encoded data slices to a corresponding device of the consensus threshold number of devices or to a unique storage unit of a set of storage units of a dispersed storage network (DSN) memory for storage therein; and
when determining at least a consensus threshold number of devices are not active in the VPN group of devices, prohibiting each of the devices in the VPN group of devices from encoding the data segment of group specific data; and
when determining at least a consensus threshold number of devices are not active in the VPN group of devices, further prohibiting each of the devices in the VPN group of devices from accessing previously created group specific data.

2. The method of claim 1 further comprises:
establishing the VPN group of devices; and
establishing error coding parameters based on the consensus threshold number of devices in the VPN group of devices and the number of devices in the VPN group of devices for accessing the group specific data.

3. The method of claim 1, wherein the encoding the group specific data further comprises:
encrypting the group specific data using an encryption key.

4. The method of claim 3 further comprises:
encoding the encryption key based on the consensus threshold number of devices and the number of devices in the VPN group of devices to produce one or more sets of encoded key slices; and
sending the one or more sets of encoded key slices to at least one of the consensus threshold number of devices or the DSN memory for storage therein.

5. The method of claim 4 further comprises:
when the set of encoded data slices is sent to the DSN memory for storage, sending the one or more sets of encoded key slices to the consensus threshold number of devices for distributed storage therein; or
when the set of encoded data slices is sent to the consensus threshold number of devices for storage, sending the one or more sets of encoded key slices to the DSN memory for storage.

6. The method of claim 1 further comprises:
generating data directory information regarding storage of the group specific data;
encoding the data directory information based on the consensus threshold number of devices and the number of devices in the VPN group of devices to produce one or more sets of encoded directory slices; and
sending the one or more sets of encoded directory slices to at least one of the consensus threshold number of devices or the DSN memory for storage therein.

7. The method of claim 6 further comprises:
when the set of encoded data slices is sent to the DSN memory for storage, sending the one or more sets of encoded directory slices to the consensus threshold number of devices; or
when the set of encoded data slices is sent to the consensus threshold number of devices, sending the one or more sets of encoded directory slices to the DSN memory for storage.

8. The method of claim 1, wherein determining whether a consensus threshold number of devices are active in the VPN group of devices further includes verifying a proximity of the consensus threshold number of devices in accordance with a group gathering threshold.

9. A computer readable memory device comprises:
a first memory section that stores operational instructions that, when executed by one of a virtual private network (VPN) group of devices, causes the one of the VPN group of devices to:
determine whether at least a consensus threshold number of devices of the VPN group of devices are active by:
verifying user identifiers (IDs) affiliated with the VPN group of devices;
verifying a unique user code related to group specific data; and
verifying a peer-to-peer communication between the consensus threshold number of devices;
when determining at least a consensus threshold number of devices are active in the VPN group of devices, a second memory section that stores operational instructions that, when executed by a device of the at least the consensus threshold number of devices, causes the device to:
encode a data segment of group specific data based on a consensus threshold number of devices in the VPN group of devices and a number of devices in the VPN group of devices to produce a set of encoded data slices, wherein the consensus threshold number corresponds to a decode threshold number of encoded data slices of the set of encoded data slices required to reconstruct the data segment and the number of devices in the VPN group corresponds to a total number of encoded data slices in the set of encoded data slices;
send a unique encoded data slice of the decode threshold number of encoded data slices to a corresponding device of the consensus threshold number of devices or to a unique storage unit of a set of storage units of a dispersed storage network (DSN) memory for storage therein;
the first memory section further stores operational instructions that, when executed by the one of the VPN group of devices, causes the one of the VPN group of devices to:
when determining at least a consensus threshold number of devices are not verified as active in the VPN group of devices, prohibit encoding the data segment of group specific data; and
when determining at least a consensus threshold number of devices are not verified as active in the VPN group of devices, further prohibiting each of the devices in the VPN group of devices from accessing previously created group specific data.

10. The computer readable memory device of claim 9, wherein the first memory section further stores operational instructions that, when executed by the one of the VPN group of devices, causes the one of the VPN group of devices to:

establish the VPN group of devices; and establish error coding parameters based on the consensus threshold number of devices in the VPN group of devices and the number of devices in the VPN group of devices for accessing the group specific data.

11. The computer readable memory device of claim 9, wherein the first memory section further stores operational instructions that, when executed by the one of the VPN group of devices, causes the one of the VPN group of devices to:

encrypt the group specific data using an encryption key.

12. The computer readable memory device of claim 11, wherein the second memory section further stores operational instructions that, when executed by the device, causes the device to:

encode the encryption key based on the consensus threshold number of devices and the number of devices in the VPN group of devices to produce one or more sets of encoded key slices; and send the one or more sets of encoded key slices to at least one of the consensus threshold number of devices or the DSN memory for storage therein.

13. The computer readable memory device of claim 12, wherein the second memory section further stores operational instructions that, when executed by the device, causes the device to:

when the set of encoded data slices is sent to the DSN memory for storage, send the one or more sets of encoded key slices to the consensus threshold number of devices; or when the set of encoded data slices is sent to the consensus threshold number of devices, send the one or more sets of encoded key slices to the DSN memory for storage.

14. The computer readable memory device of claim 9, wherein the second memory section further stores operational instructions that, when executed by the device, causes the device to:

generate data directory information regarding storage of the group specific data;

encode the data directory information based on the consensus threshold number of devices and the number of devices in the VPN group of devices to produce one or more sets of encoded directory slices; and send the one or more sets of encoded directory slices to at least one of the consensus threshold number of devices or the DSN memory for storage therein.

15. The computer readable memory device of claim 14, wherein the second memory section further stores operational instructions that, when executed by the device, causes the device to:

when the set of encoded data slices is sent to the DSN memory for storage, send the one or more sets of encoded directory slices to the consensus threshold number of devices; or when the set of encoded data slices is sent to the consensus threshold number of devices, send the one or more sets of encoded directory slices to the DSN memory for storage.

16. The computer readable memory device of claim 9, wherein determining whether at least a consensus threshold number of devices of the VPN group of devices are active further includes verifying a proximity of the consensus threshold number of devices in accordance with a group gathering threshold.

* * * * *